(12) United States Patent
Glückstad

(10) Patent No.: US 6,842,285 B2
(45) Date of Patent: Jan. 11, 2005

(54) METHOD AND APPARATUS FOR GENERATING A PHASE-MODULATED WAVE FRONT OF ELECTROMAGNETIC RADIATION

(75) Inventor: Jesper Glückstad, Rødovre (DK)

(73) Assignee: Riso National Laboratory, Roskilde (DK)

( * ) Notice: Subject to any disclaimer, the term of this patent is extended or adjusted under 35 U.S.C. 154(b) by 366 days.

(21) Appl. No.: 10/021,562

(22) Filed: Dec. 19, 2001

(65) Prior Publication Data

US 2002/0122254 A1 Sep. 5, 2002

Related U.S. Application Data

(60) Provisional application No. 60/257,093, filed on Dec. 22, 2000.

(51) Int. Cl.$^7$ ............................. G02B 27/46; G02F 1/01
(52) U.S. Cl. ........................................ 359/559; 359/279
(58) Field of Search ................................. 359/559, 279, 359/278, 276, 238, 237

(56) References Cited

U.S. PATENT DOCUMENTS 5,579,136 A   11/1996   Fukui et al.
5,736,958 A  *  4/1998  Turpin ........................ 342/179

OTHER PUBLICATIONS

Yukihiro Ishii et al., "Real–time phase –only matched filtering with dual liquid–crystal spatial light modulators", Optics Communications, vol. 132, Nov. 15, 1996, pp. 153–160.

Christophe Gorecki et al., "Real–Time Pattern Recognition by Vanderlugt Correlator Using Amplitude and Phase Modulation Properties of the Epson Liquid–Crystal TV", Optical Review, vol. 3, No. 3, 5/96, pp. 171–176.

D. Casasent (Ed.), "Optical Data Processing", 1978, Springer–Verlag, Berlin, DE, XP002182118, pp. 65–66.

Jesper Gluckstad et al., "Reverse phase contrast for the generation of phase–only spatial light modulation", Optics Communications, vol. 197, Oct. 1, 2001, pp. 261–266.

* cited by examiner

*Primary Examiner*—Ricky Mack
*Assistant Examiner*—Tuyen Tra
(74) *Attorney, Agent, or Firm*—Volentine Francos, PLLC

(57) ABSTRACT

The present invention provides a method and a system for generating a phase-modulated wave front. According to the present invention, the spatial phase-modulation is not performed on the different parts of the wave front individually as in known POSLMs. Rather, the spatial phase-modulation of the present invention is performed by generating an amplitude modulation in the wave front, Fourier or Fresnel transforming the amplitude modulated wave front, filtering Fourier or Fresnel components of the Fourier or Fresnel distribution with a spatial filter such as a phase contrast filter, and regenerating the wave front whereby the initial amplitude modulation has transformed into a phase-modulation.

80 Claims, 13 Drawing Sheets

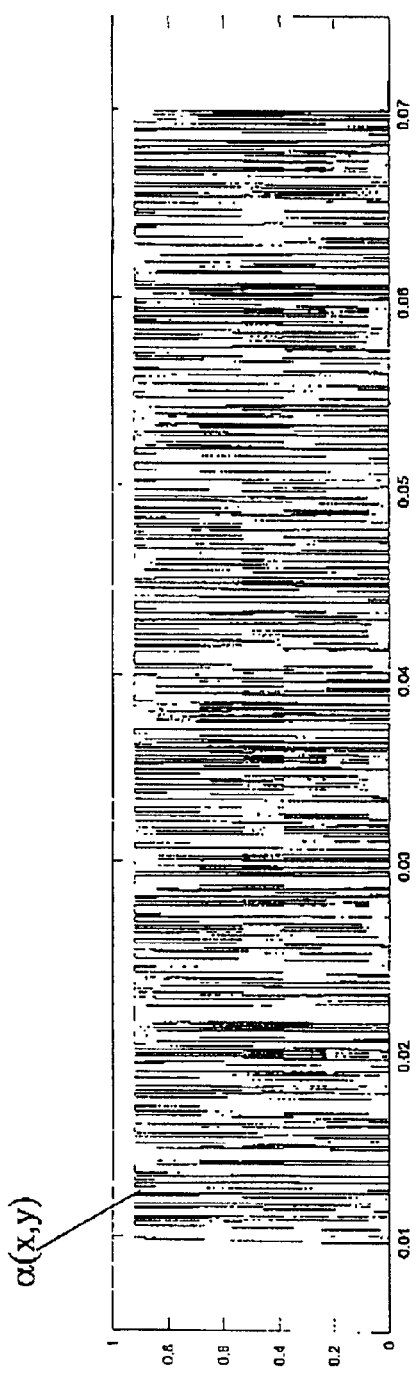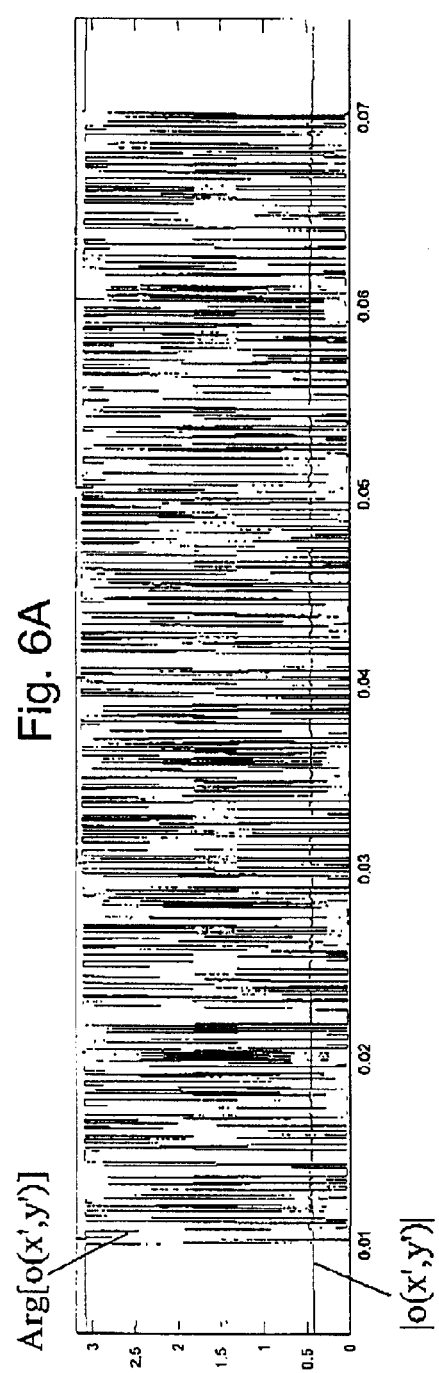

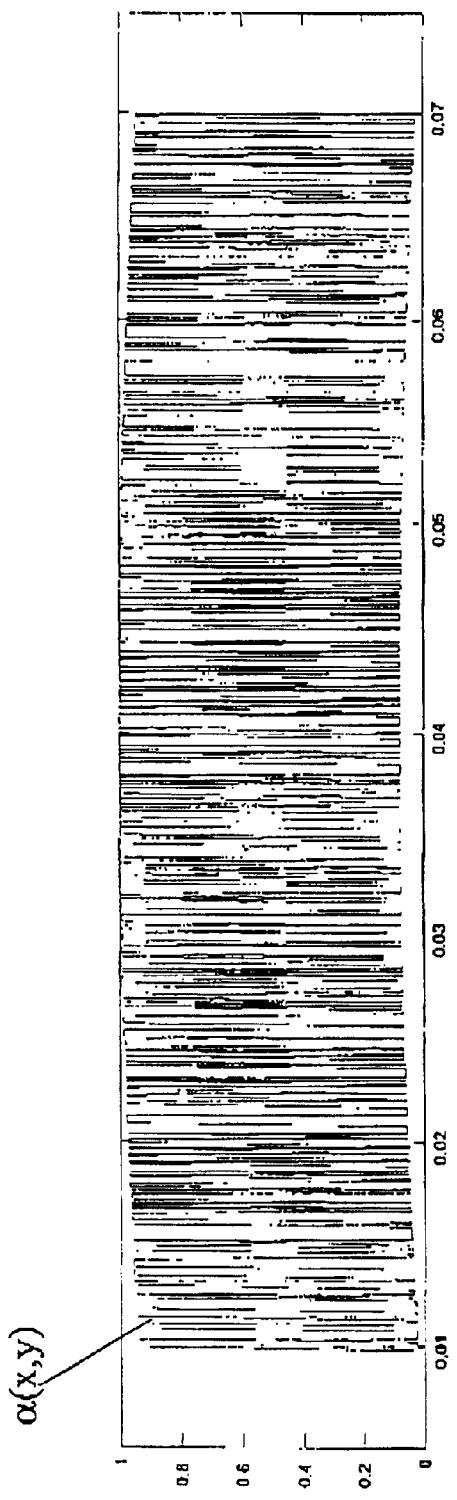
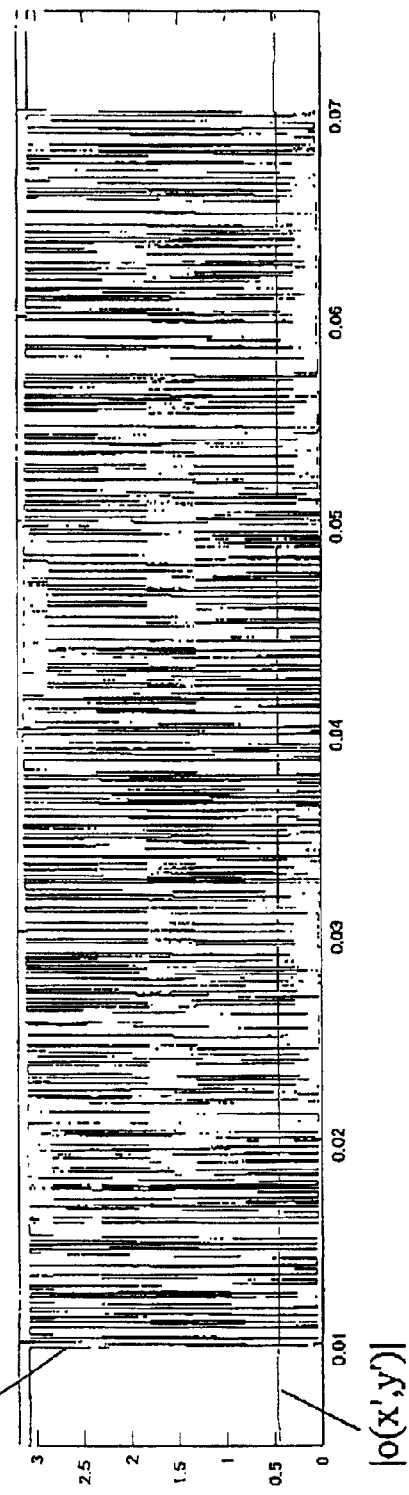
Fig. 7A
Fig. 7B

METHOD AND APPARATUS FOR GENERATING A PHASE-MODULATED WAVE FRONT OF ELECTROMAGNETIC RADIATION

CROSS REFERENCE TO RELATED APPLICATIONS

The present application claims priority under 35 U.S.C. 119(e) to U.S. Provisional Application No. 60/257,093 filed on Dec. 22, 2000, which is hereby incorporated by reference in its entirety for all purposes.

FIELD OF THE INVENTION

The present invention relates generally to the field of phase modulation of images to form an image having a specific spatial phase modulation. More particularly, the invention relates to a method and a system for generating a phase-modulated wave front wherein the spatial phase-modulation is not performed on the different parts of the wave front individually as in known spatial phase modulators. Rather, the spatial phase modulation according to the present invention is performed by generating an amplitude modulation in the wave front, filtering the spatial frequency components in Fourier or Fresnel space, and regenerating the wave front whereby the initial amplitude modulation has transformed into a phase modulation.

BACKGROUND OF THE INVENTION

Most transparent objects affect the spatial phase relation of a transmitted wave front of light since different parts of the wave front experience slightly different optical path—lengths. The transparent object thereby performs a spatial phase-modulation on the wave front which is unique for the object. The resulting wave front depends upon the object itself as well as upon the initial spatial phase-distribution over the wave front of the incoming light. Therefore, it is normally only of interest to phase-modulate light from a light source having a well defined spatial phase-distribution, typically light originating from coherent light from a laser. When applying light with well-defined spatial phase-distribution, the output becomes a representation of the spatial differences in the optical properties of the object along the path of the light.

In general, a phase shift $\delta$ between two rays of light is given by $$\delta = 2\pi \Delta\Lambda/\lambda_0 + (\phi_2 - \phi_1), \quad (1)$$

where $\lambda_0$ is the wavelength of the radiation in vacuum, $\Delta\Lambda$ is the difference in optical path length traveled by the light rays, and $(\phi_2 - \phi_1)$ is the initial phase shift between the rays. According to Equation (1), to induce a spatial phase shift, an object has to change the optical path length $\Lambda$ for one part of the radiation in relation to $\Lambda$ for another part of the radiation. The optical path length is given by $\Lambda = nL$, where n is the refractive index of the medium and L is the distance traveled through the medium. Thus in order to induce a phase shift, one can either change the refractive index of the medium or the distance traveled in the medium.

Thus, generating a wave front with a specific simple spatial phase-modulation is a conceptual simple (though technically cumbersome) task if one knows how to prepare the object to have a specific refractive constant or thickness along the path of the light. If e.g. the object is a window with varying thickness, two trajectories of equal length but through different parts of the window will experience different optical path lengths, which will induce a phase difference in the transmitted wave front. Such an object will always perform the same specific spatial phase modulation when given the same incoming light.

Generating spatially phase-modulated wave fronts with dynamically controllable phase modulation is a difficult task since one needs an object in which the optical path length can be controlled dynamically. Thereby, the phase relation between different parts of the resulting wave front may be dynamically controlled.

In the prior art, dynamically controllable spatial phase-modulators are known as Phase Only Spatial Light Modulators (POSLM), and typically consist of a matrix of dynamically addressable phase-modulating elements in a transmitting or a reflecting configuration. In order to have POSLMs of practical use, one needs a resolution comparable to modern televisions and monitors, typically in the form of an array of tens of thousands of individually addressable phase modulating elements. Such devices are very delicate and sensitive and are only produced by highly specialized manufacturers around the world. All these issues add to the costs of fabrication, and phase modulators are extremely expensive devices.

In transmitting POSLMs, each phase-modulating element is transparent in order for light to pass through the element. Controlling the thickness or the refractive index of each element may control the optical path length of each element. For dynamically controllable POSLMs, the addressing electronics between the phase-modulating elements introduces large dead-space giving rise to a residual amplitude modulation in the phase-modulated image. This amplitude modulation is multiplied with phase modulation to give a "zero transmission" pattern in the resulting image as well as noise due to diffraction on the dead space areas. Present transmitting POSLMs have a low fill factor, typically 50%.

Seiko-Epson produces a transmitting liquid crystal SLM (LC-SLM) having a high resolution matrix of transparent liquid crystal elements wherein the relative permittivity of each element can be electrically modulated in order to induce a change $\Delta n$ in the refractive index and thereby the optical path length of the element. The addressing electronics between the phase-modulating elements introduces a large dead-space giving rise to a residual amplitude modulation in the phase-modulated image as well as a low fill factor (<50%).

Meadowlark produces a parallel-aligned liquid crystal modulator (PAL-SLM) with a high fill factor, but this device has a very low resolution in that it contains only 137 phase-modulating elements.

Reflecting POSLMs are typically simpler to fabricate since here, the phase-modulating elements need not be transparent which allows for any bulk electronics to be positioned on the backside. This also allows a much smaller dead space between the elements. Therefore, reflective POSLMs typically have larger fill factors than transmitting POSLMs. In reflecting POSLMs, the optical path length of each element may be controlled by controlling the "depth" of the reflective surface (stroke) or the refractive index of a material layer above the reflective surface.

In general, the reflection configuration of POSLMs is an optically disadvantageous configuration since it increases the required number of optical components needed to guide the light. If a reflective POSLM is arranged in an on-axis geometry, a beam splitter is needed in the optical set-up, which typically introduces 75% loss (two times 50% loss). The beam splitter may be avoided in an off-axis geometry, which however introduces a number of other disadvantages.

Hamamatsu Photonics produces a dynamically controllable PAL-SLM with XGA resolution. Texas Instruments produces a Digital Mirror Device (DMD) having an array of mirrors each of which can be tilted between two positions.

In summary, all known POSLMs are based on the principle of phase modulating the image on a "pixel-by-pixel basis" where the optical path length in each phase modulating element must be dynamically controlled. This is a strenuous, and expensive method and the devices are delicate and sensitive.

SUMMARY OF THE INVENTION

According to the present invention, a spatial phase-modulation is performed by generating an amplitude modulation in an input wave front, Fourier or Fresnel transforming the amplitude modulated wave front, phase-shifting and/or damping Fourier or Fresnel components of the Fourier or Fresnel distribution with a spatial filter such as a phase contrast filter, and regenerating the wave front whereby the initial amplitude modulation is transformed into a phase modulation.

The method and system of the present invention is thereby conceptually different from known methods and systems for generating phase-modulated wave fronts. As described previously, the known methods and systems generating phase-modulated wave fronts induce a phase modulation by modulating the optical path length for each spatial part of the wave front in a matrix of phase modulating elements.

In a first aspect, the present invention provides a method for generating a phase-modulated wave front of electromagnetic radiation comprising the steps of:

providing an input wave front of electromagnetic radiation, $E(x,y)$, performing a spatial amplitude modulation $\alpha(x,y)$ on the input wave front to generate a spatial amplitude distribution $a(x,y)$ in the electromagnetic radiation in a plane transverse to a direction of propagation of the electromagnetic radiation, Fourier or Fresnel transforming the amplitude-modulated wave front $a(x,y)$ to form a Fourier or Fresnel distribution of the amplitude-modulated wave front $\tilde{a}(f_x,f_y)$, said Fourier or Fresnel distribution comprising Fourier or Fresnel components, filtering the Fourier or Fresnel distribution by phase shifting at least part of a zero-order component of the Fourier or Fresnel distribution $\bar{a}(f_x,f_y)$ in relation to other components of the Fourier or Fresnel distribution and/or damping a zero-order component of the Fourier or Fresnel distribution $\tilde{a}(f_x,f_y)$ in relation to other components of the Fourier or Fresnel distribution by a spatial filter having a filter function $H(f_x,f_y)$ giving the phase shift and/or damping of the zero-order component in relation to higher-order components of the Fourier or Fresnel distribution $\bar{a}(f_x,f_y)$, and inverse Fourier or inverse Fresnel transforming the filtered electromagnetic radiation to form a phase-modulated wave front $o(x', y')$, said phase-modulated wave front being a function of at least the input wave front $E(x,y)$, the amplitude modulation $\alpha(x,y)$, and the filter function $H(f_x,f_y)$.

In the present application, an apostrophe on a set of coordinates indicates that they refer to the wave front after the inverse Fourier or Fresnel transformation. Similarly, a utilizing coordinates $f_x$, $f_y$ (,$f_z$) indicates that they refer to a Fourier or Fresnel transformed wave front.

The method according to the first aspect may be performed using a system for generating a phase-modulated wave front.

Hence, in a second aspect, the present invention provides a system for generating a phase-modulated wave front of electromagnetic radiation, said system comprising:

a first deflecting and/or absorbing device for receiving an input wave front $E(x,y)$ of electromagnetic radiation, performing a spatial amplitude modulation $\alpha(x,y)$ on the input wave front by deflecting and/or absorbing parts of the wave front to generate a spatial amplitude distribution $a(x,y)$ in a plane transverse to a direction of propagation of the wave front, and emitting the amplitude modulated wave front $a(x,y)$, means for Fourier or Fresnel transforming the amplitude-modulated wave front $a(x,y)$ to form a Fourier or Fresnel distribution $\tilde{a}(f_x,f_y)$, said Fourier or Fresnel distribution comprising Fourier or Fresnel components, a spatial filter for receiving the Fourier or Fresnel distribution $\tilde{a}(f_x,f_y)$, phase shifting one or more first components in relation to one or more second components of the Fourier or Fresnel distribution and/or damping one or more third components in relation to one or more fourth components of the Fourier or Fresnel distribution, and emitting a filtered distribution $\bar{a}'(f_x,f_y)$, said spatial filter being characterized by a filter function $H(f_x,f_y)$ which gives the damping and/or phase shift for each component of the Fourier or Fresnel distribution $\bar{a}(f_x,f_y)$, means for inverse Fourier or inverse Fresnel transforming the filtered electromagnetic radiation to form a phase-modulated wave front $o(x', y')$, said phase-modulated wave front being a function of at least the input wave front $E(x,y)$, the amplitude modulation $\alpha(x,y)$, and the filter function $H(f_x,f_y)$.

The present method and system rely on the principle of generating a phase modulation by initially generating an amplitude modulation and filtering one or more spatial frequency components of the amplitude modulation in Fourier or Fresnel space to form an interference pattern which substantially counterbalance (that is removes) the generated amplitude modulation leaving a phase-only modulation of the initial wave front. The filtering applies a standard spatial phase modulation, and thus the spatial filter may be a phase modulator according to the state of the art. However, there are a number of advantages in performing the filtering directly on the spatial frequency components in Fourier or Fresnel space.

First, since there is no need for a phase modulator having size and resolution corresponding to the size and resolution of the desired phase-modulated wave front, the fabrication of phase modulating systems is made simpler, easier and cheaper compared to the prior art. Preferably, only one or a few of the Fourier or Fresnel components need to be filtered, whereby a very simple filter with only one or few phase and/or amplitude modulating elements may be applied. Moreover, since only one or few phase modulating elements is needed to perform the filtering, the filter may be designed to reduce or avoid dead space between the phase modulating elements.

The phase modulation of different parts of the wave front is generated from an amplitude modulation of corresponding parts of the input wave front. Performing an amplitude modulation is a much simpler and cheaper task than performing a phase modulation and may be generated with a variety of sizes and resolutions using standard ASLMs.

Also, the present invention allows for controllably generating non-pixilated (continuously varying) phase modulations by using non-pixilated (continuously varying) amplitude modulations such as photographic films. It has not previously been possible to generate such non-pixilated (continuously varying) phase modulations in a controlled manner.

Thus, the present invention represents a highly innovative progress in the field of phase modulation and phase modulators. The present invention is also a generic invention since it provides a conceptually new method and a conceptually new system for performing phase-modulation.

Preferably, the method according to the first aspect of the present invention is performed by filtering only the zero-order spatial frequency component of the amplitude modulated wave front in Fourier or Fresnel space. Hence, according to a third aspect, the present invention provides a method for generating a phase-modulated wave front according to the first aspect, wherein the step of phase shifting and/or damping one or more components is replaced by a step of:

filtering the Fourier or Fresnel distribution by phase shifting at least part of a zero-order component of the Fourier or Fresnel distribution $\bar{a}(f_x,f_y)$ in relation to other components of the Fourier or Fresnel distribution and/or damping a zero-order component of the Fourier or Fresnel distribution $\tilde{a}(f_x,f_y)$ in relation to other components of the Fourier or Fresnel distribution by a spatial filter having a filter function $H(f_x,f_y)$ giving the phase shift and/or damping of the zero-order component in relation to higher-order components of the Fourier or Fresnel distribution $\tilde{a}(f_x,f_y)$.

The method according to the first aspect may be performed using a system for generating a phase-modulated wave front. Hence, according to a fourth aspect, the present invention provides a system according to the second aspect for generating a phase-modulated wave front, wherein the spatial filter is replaced by a spatial filter for receiving the Fourier or Fresnel distribution $\bar{a}(f_x,f_y)$, phase shifting a zero-order component of the Fourier or Fresnel distribution in relation to other components of the Fourier or Fresnel distribution and/or damping a zero-order component of the Fourier or Fresnel distribution in relation to other components of the Fourier or Fresnel distribution, and emitting a filtered distribution $\bar{a}'(f_x,f_y)$, said spatial filter being characterized by a filter function $H(f_x,f_y)$ which gives the damping and/or phase shift of the zero-order component in relation to other components of the Fourier or Fresnel distribution $\tilde{a}(f_x,f_y)$.

In the present specification and claims, it is important to interpret the properties of electromagnetic (EM) radiation correctly. An electromagnetic wave can be given by:

$$E(x,y,z)=E_0(x,y)e^{i(\omega t-kz+\phi(x,y))} \quad (2)$$

and $$B(x,y,z)=B_0(x,y)e^{i(\omega t-kz+\phi(x,y))} \quad (3)$$

assuming that the wave propagates in the z-direction, where $E_0$ and $B_0$ are the amplitudes, $\omega$ the angular frequency, t the time, k the wave number, and $\phi(x,y)$ is an initial phase value.

In the present specification and claims, the term "radiation" refers to electromagnetic (EM) radiation unless otherwise stated or implied. Also, in the present specification and claims, the term "wave front" refers to a planar section of the propagating radiation in a plane at least substantially perpendicular to the direction of the Poynting vector of the radiation. Typically, the direction of the Poynting vector of the radiation is at least substantially equal to the direction of propagation of the radiation and these will be referred to interchangeably. The term "wave front" is not restricted to the first part of a ray or pulse of radiation, rather, a ray or a pulse may be considered as an (infinite) number of wave fronts. Neither is wave front restricted to mean a two dimensional distribution of radiation, wave front may also designate a ray of light having a substantially line- or point-like cross section. In some contexts, the term "wave front" may be understood as simply a one- or two-dimensional distribution of electromagnetic radiation and may also be referred to as an image.

Regarding Equations (2) and (3) in relation to a wave front, it may be seen that if the direction of propagation is along the z-axis in a Cartesian coordinate system, the wave front may be described in the x, y-plane. Hence, a wave front can be characterized by its complex amplitudes of the electric and magnetic fields $E(x,y)$ and $B(x,y)$ over the wave front. In the present specification and claims, the term "amplitude", amplitude distribution, or "spatial amplitude" will refer to the complex amplitude of the electric field, having both an amplitude distribution, $|E(x,y)|$, and a phase distribution $\arg[E(x,y)]$, unless otherwise stated. Also, a spatial amplitude modulation may be performed on the wave front meaning a change of the spatial amplitude over the wave front according to a function $\alpha(x,y)$ giving the change in amplitude at each position (x,y) of the wave front as a result of the modulation $\alpha(x,y)$. The amplitude distribution resulting from an amplitude modulation $\alpha(x,y)$ will in the present application be denoted $a(x,y)$. If the wave front initially has a constant amplitude $E(x,y)=E$, the resulting amplitude distribution will correspond to the performed amplitude modulation $\alpha(x,y)$.

Similarly, the relative values of the phases of different parts of the wave front is denoted by the function $\phi(x,y)$. Also, a spatial phase modulation $\phi(x,y)$ may be performed on the wave front meaning a change of the relative spatial phase over the wave front corresponding to multiplying (2) or (3) with a factor $e^{i\phi(x,y)}$ denoted a phasor value or phasor. Since an input wave front will typically have a flat or constant phase $\phi(x,y)=$constant, and since only relative phases can be considered, the phase distribution of a phase modulated wave front may also be expressed by $\phi(x,y)$.

With the term "in a plane transverse to a direction of propagation of the electromagnetic radiation" is meant that when a surface, of e.g. an optical element, modulates radiation, the surface need not be transverse to the direction of propagation, however, when the optical element has performed the modulation, the effect correspond to a projection of the optical element onto a plane transverse to the direction of propagation and hence be performed on radiation forming a wave front in a plane transverse to a direction of propagation of the radiation.

Fourier or Fresnel transforming a wave front form a diffraction pattern having a spatial distribution $\tilde{a}(f_x,f_y)$ corresponding to the amplitudes of the spatial frequency components comprised in the wave front $a(x,y)$. At the focal plane of the transformed wave front, the diffraction pattern is a Fourier transformation of the wave front, and the amplitude distribution is a Fourier distribution having Fourier components. At any other plane, the diffraction pattern is a Fresnel transformation of the wave front, and the amplitude distribution is a Fresnel distribution having Fourier components. The Fourier or Fresnel components are generally referred to according to their order. In a preferred embodiment, the Fourier or Fresnel transformation is performed by a lens, such as an achromatic lens, a Fourier lens, or a planar lens, or by a diffracting pattern or free space propagation.

When describing radiation from a Fourier or Fresnel transformed wave front, one typically works in the Fourier or Fresnel space with coordinates $(f_x, f_y, f_z)$ Hence, when filtering the Fourier or Fresnel distribution $a(f_x, f_y)$, a phase modulation $\phi_F(f_x, f_y)$ and/or an amplitude modulation $\alpha_F(f_x, f_y)$ is performed on the components in the Fourier or Fresnel space. The phase and/or amplitude modulation performed by the filter is in general determined by the filter function $H(f_x, f_y)$ of the filter, $H(f_x, f_y)$ giving the phase shift and the damping of radiation of the filter at coordinates $(f_x, f_y)$. The filtered Fourier or Fresnel distribution is marked with apostrophe to indicate that the amplitude distribution has been filtered, thus, after the filtering, the amplitude distribution is written as $\tilde{a}'(f_x, f_y) = H(f_x, f_y) \tilde{a}(f_x, f_y)$.

An inverse Fourier or Fresnel transformation of the filtered wave front $\tilde{a}'(f_x, f_y)$ will form a diffraction pattern which "regenerates" a wave front corresponding to the initial amplitude modulated wave front $a(x,y)$. However, the filtering have induced some important changes, and the resulting amplitude distribution $o(x',y')$ have an amplitude and phase distribution which primarily is a function of the input wave front, the amplitude modulation and the filtering. Naturally, a number of other parameters such as aberration effects and noise will affect the resulting wave front, but controlling the amplitude modulation and the filtering will control the phase modulation performed on the input wave front.

In order to control the phase modulation of the resulting wave front $o(x',y')$, the spatial amplitude modulation $\alpha(x,y)$ may be adjusted in relation to the filter function $H(f_x, f_y)$, or vice versa.

Thus, the system according to the present invention preferably comprise a controller for controlling the spatial amplitude modulation $\alpha(x,y)$ in relation to the filter function $H(f_x, f_y)$, or vice versa, in order for the system to generate a predetermined phase-modulated wave front.

In order to control or adjust the spatial amplitude modulation $\alpha(x,y)$ in relation to the filter function $H(f_x, f_y)$, at least one of the first deflecting and/or absorbing devices and the spatial filter is preferably addressable and adapted to receive a control signal controlling the amplitude modulation $\alpha(x,y)$ and/or the filter function $H(f_x, f_y)$. Thus, the controller preferably comprises interface means for addressing the first deflecting and/or absorbing device and/or the spatial filter and for transmitting signals controlling the amplitude modulation $\alpha(x,y)$ and/or the filter function $H(f_x, f_y)$.

The amplitude modulation $\alpha(x,y)$ and the filter function $H(f_x, f_y)$ are preferably controlled in relation to values generated inside the controller or to values generated outside the controller and transmitted to the controller. Thus, the controller preferably comprises electronic processing means for calculating values related to the amplitude modulation $\alpha(x, y)$ and/or the filter function $H(f_x, f_y)$, or parameters thereof. Also, the controller may comprise holding means for holding values related to the amplitude modulation $\alpha(x,y)$ and/or the filter function $H(f_x, f_y)$, the controller being adapted to generate the control signals transmitted by the interface means on the basis of the information comprised in the holding means.

The first deflecting and/or absorbing device and the spatial filter may be divided or pixilated into a number of individual parts $(x,y)$, each performing an amplitude modulation or filtering on a part of the received wave front. Thus, the controller may assign different values of $\alpha(x,y)$ and/or $H(f_x, f_y)$ to different parts of the first deflecting and/or absorbing device or the spatial filter.

The controller may comprise any electronic processor such as a computer, a microprocessor, integrated circuits, etc. The interface means be based on electronic transmission of analogue or digital signals to the amplitude modulator, the spatial filter, or to pixels of these. Also, the interface means may be based on addressing by electromagnetic radiation such as RF or MW signals controlling the state of electronic controllers placed on the amplitude modulator, the spatial filter, or in relation to pixels of these. However optical signals such as signals generated by a laser may address the amplitude modulator, the spatial filter, or individual pixels of these in order to control the damping, reflectivity or phase shift of the illuminated region by an optical process. Addressing by lasers may make use of various laser-scanning techniques in order to address a large number of pixels.

Alternatively, a range of values for $\alpha(x,y)$ and $H(f_x, f_y)$ may be held at the first deflecting and/or absorbing device and/or the spatial filter, whereby the one or more controlling signals controls which value to apply to the addressed part.

Preferably, the spatial phase distribution of the input wave front $E(x,y)$ is at least substantially constant over the wave front. Also, the input radiation is at least substantially spatially and temporally coherent, and the radiation is monochromatic or quasi-monochromatic so that the energy of the electromagnetic radiation is concentrated in a narrow frequency bandwidth. Since the principle of the present invention is based on interference of different parts of an electromagnetic wave front originating from a common source of electromagnetic radiation, it is required that the frequency range of the emitted electromagnetic radiation is sufficiently narrow to ensure that the different spatial parts are coherent so that their superposition generates the desired intensity pattern. If the frequency range is too broad, the two waves will be incoherent and the phase information may be lost.

Preferably, the electromagnetic radiation is generated by a coherent source of electromagnetic radiation, such as a laser, a maser, a phase-locked laser diode array, etc. However, a high-pressure arc lamp, such as a Hg lamp, a Xe lamp, etc, may also be used.

In a preferred embodiment, the first deflecting and/or absorbing device comprises a matrix of deflecting and/or absorbing elements, wherein each element may be individually addressed by interface means in order to control the deflection and/or absorption of each element individually, that is to control the value of $\alpha(x,y)$ at different positions $(x,y)$ of the device.

Preferably, a pixilated first deflecting and/or absorbing device is an amplitude modulator such as a standard ASLM such as a liquid crystal display sandwiched between crossed polarizers or a MEMS based device. Preferably, such pixilated device has a resolution of at least 100 pixels/cm$^2$ and preferably comprises at least 100 pixels and typically several thousands pixels.

Alternatively, the first deflecting and/or absorbing device may be non-pixilated to provide a substantially continuous variation of absorption and/or deflection in a plane transverse to a direction of propagation of the electromagnetic radiation. Non-pixilated and continuously varying should be interpreted as being smooth on a macroscopic scale. In this case, $\alpha(x,y)$ would be a continuous function in x and y. A non-pixilated device may be established by polymeric materials or a photographic film such as a silver halide film.

In its simplest implementation, the amplitude modulation may be performed simply by a transparent sheet with a pattern or an image formed thereon. Such device may be either pixilated or non-pixilated.

The input wave front preferably has a substantially constant amplitude. Typically, wave fronts from radiation sources has varying amplitude which may be substantially constant within confined regions. Thus, the first deflecting and/or absorbing device may comprise an aperture for truncating the input wave front to define a transverse spatial profile for the amplitude modulated wave front a(x,y). Alternatively, the controller may be adapted to control the spatial amplitude modulation α(x,y) to define a transverse spatial profile for the amplitude modulated wave front a(x,y). Also, the spatial amplitude modulation α(x,y) may be controlled to level out known amplitude variations in the input wave front. The resulting spatial profile of the amplitude modulated wave front a(x,y) are preferably a profile selected from the group consisting of triangular, rectangular, quadratic, rhombic, pentagonal, hexagonal, circular, ellipsoidal.

In the present specification, the first deflecting and/or absorbing device in its broadest sense may also be referred to by the more descriptive term "amplitude modulator".

The means for Fourier or Fresnel transformation and/or the means for inverse Fourier or Fresnel transformation are preferably selected from the group consisting of achromatic lenses, Fourier lenses doublets planar lenses, diffracting patterns, free space propagation. Lenses may be used in a 4f-lens configuration (two Fourier transforming lenses utilizing transmission of light) or a 2f configuration (one Fourier transforming lens and a reflective spatial filter). However, any optical imaging system providing a filtering plane for the spatial filter may be applied. The lenses need not have identical focal lengths, different focal lengths lead to a magnification ratio different from one.

A spatial filter is a component that changes the phase and/or the amplitude of an electromagnetic wave incident upon it according to the filter function $H(f_x,f_y)$. The spatial filter may transmit or reflect the incident electromagnetic wave.

The spatial filter may be fixed so that the phase shift and/or damping of each part of the spatial filter may have a fixed value specific to the filter. Fixed spatial filters may be realized utilizing fixed phase masks, such as phase contrast filters in the form of an optically flat glass plate coated with a dielectric layer at specific positions of the glass plate.

Alternatively, the spatial filter may comprise one or more individually addressable and controllable phase shifting and/or damping elements, each of which elements modulating the incident wave front by changing its phase and/or amplitude by a predetermined value. Here, the controller may be adapted to individually control the one or more phase shifting and/or damping elements in order to individually control the phase shift and/or damping of selected components of the Fourier or Fresnel distribution $\tilde{a}(f_x,f_y)$ in relation to other components of the Fourier or Fresnel distribution.

The predetermined values of $H(f_x,f_y)$ may be assigned to each element in different ways depending upon the technology applied in the component. For example the spatial filter may be controllable in that each element may be addressed either optically or electrically. The electrical addressing technique resembles the addressing technique of solid-state memories in that individual parts may be addressed through electronic circuitry to receive a control signal assigning the phase and/or amplitude change to be generated by the element. The optical addressing technique may address each element by pointing a light beam on it, the intensity of the light beam corresponding to the phase and/or amplitude change to be generated by that element when illuminated by a wave front.

Dynamically addressable and controllable spatial filters may be realized by devices comprising liquid crystals and being based on liquid crystal display technology, dynamic mirror devices, digital micro mirror arrays, deformable mirror devices, membrane spatial light modulators, laser diode arrays (integrated light source and phase modulator), smart pixel arrays, etc.

The first deflecting and/or absorbing device and the spatial filter may both be either transmitting or reflecting, meaning that the amplitude modulation α(x,y) or filtering $H(f_x,f_y)$ may be performed on a wave front transmitted or reflected from the device/filter. Thereby, several different configurations may be possible for the system, namely configurations wherein the first deflecting and/or absorbing device and the spatial filter are both reflecting, wherein they are both transmitting, or wherein one is transmitting and one is reflecting. Preferably, the first deflecting and/or absorbing device and the spatial filter are both transmitting since this allows for a compact low-loss configuration of the system.

In a preferred embodiment of the present invention, the spatial amplitude modulation α(x,y) is adjusted in relation to the filter function $H(f_x,f_y)$, or vice versa, in order to generate a predetermined phase-modulation o(x',y'). Preferably, this predetermined phase-modulation is a phase-only modulation resulting in a generated wave front o(x',y') having a constant amplitude distribution |o(x',y')|=constant.

According to the third and fourth aspect of the present invention, the Fourier or Fresnel distribution is filtered in a zero-order spatial filter, phase shifting only the zero-order component in relation to higher order components. In the following, a number of preferred embodiments and the scheme for adjusting α(x,y) in relation to $H(f_x,f_y)$ according to the third and fourth aspect is provided. A full mathematical derivation of the presented formulas is given for a specific system geometry in an appendix to the application.

In general, the amplitude modulation α(x,y) will have a minimum value Min(α(x,y)), a maximum value Max(α(x,y)) and an average value $\bar{\alpha}$. Given the values of Min(α(x,y)), Max(α(x,y)) and $\bar{\alpha}$, it is still possible to make α(x,y) any desired shape since only the amplitude and an off-set is constrained.

The mathematical expressions according to which the adjustment of α(x,y) in relation to $H(f_x,f_y)$ is performed depends significantly on the spatial profile of the wave front, or equivalently the input aperture, chosen in the system at hand. The spatial profile of the wave front may be defined by e.g. the input wave front, an aperture or iris or a sharp cut-off in the amplitude modulation α(x,y). The spatial profile determines the geometry (or modes) in the Fourier or Fresnel distribution and the shape of the zero-order component, and thus have important consequences throughout the system.

As the input wave front is typically truncated by an aperture, diffraction effects will arise at the edge of the aperture. A similar truncation takes place in the central part of the filter. Thus, the resulting amplitude modulated wave front o(x',y') contains remnants from these diffraction effects. In a detailed analysis, a synthetic reference wave (SRW) g(r') is introduces describing the zero-order part of the filtered wave front o(x',y') from a system with no amplitude modulation (α(x,y)=0, only the aperture and the spatial filter is in the system). Thus a wave front propagating through an system with no amplitude modulation will be somewhat distorted, and this distortion represented by g(r') is "overlapped" with the phase modulation carried out in a system with phase modulation. In order to take the distortion represented by g(r') into consideration, the input wave front may be manipulated in a way which counterbalance the distortion, according to a function designated g(r), where g(r) can figuratively be described as g(r)=g⁻¹(r'). (the coordinates r and r' designates radii r=√x²+y² in the initial and final wave front). The SRW g(r') is determined by the geometry of the various components of the system, and is straightforward (but cumbersome) to determine. g(r) may be complicated to determine, however, depending on level of ambition, the impact of g(r') may be approximated by a simpler expression.

A zero-order spatial filter may have a part for performing the filtering of the zero order component of the Fourier or Fresnel distribution $\tilde{a}(f_x,f_y)$ and a surrounding part for performing the filtering of the higher order components. The part for performing the zero order filtration is typically a central part of the filter. The transmittivity or reflectivity, (depending on whether the spatial filter is a transmitting or reflecting component) of the central and surrounding parts may be designated by parameters A and B, where:

A is the transmittivity or reflectivity of the surrounding part, B∈[0;1] where B=1 means no damping, and B is the transmittivity or reflectivity of the central part, A∈[0;1] where A=1 means no damping.

The relative phase shift between radiation filtered by the central part and radiation filtered by the surrounding part is designated θ.

A, B, and θ are variables of the filter function $H(f_x,f_y)$ and may be combined in a combined filter term C expressed as $$C = \frac{B}{A}e^{i\theta} - 1 = |C|e^{i\Psi_c}. \quad (4)$$

where |C| and Ψ are modulus and argument of the combined filter term C. $H(f_x,f_y)$ may further comprise a term related to the shape of the central part, however, as this term is specific to the spatial profile of the wave front in the system, it will be expressed in a common geometrical parameter for the system.

In a preferred embodiment, an optimized binary phase-only modulation may be performed resulting in a wave front o(x',y') having a constant amplitude, |o(x',y')|=constant, and a binary phase distribution, arg[o(x',y')]=b(x',y'), where b(x', y') is a binary function. In the optimized embodiment, the spatial filter is a loss less filter having A=B=1 and θ=π, and the spatial amplitude modulation α(x,y) is performed according to $$\alpha(x, y) = b(x, y) + \bar{b}\left[\frac{1}{2} - \bar{g}\right]^{-1} g(r), \quad (5)$$

where b(x,y) is a binary function with an average value $\bar{b}$, g(r) is a function which counterbalancing the effects represented by a synthetic reference wave g(r') of the system, and $\bar{g}$ is the average value of g(r). The resulting phase modulation b(x',y') is similar to the binary function b(x,y) of the amplitude modulation, except for possible magnification factors.

In the present context, the term binary means "two-valued" meaning a property of having or showing two values or levels which are typically different and not necessarily "0" and "1" or "zero" and "not zero", but may be any two values or levels such as "30%" and "50%".

The term binary spatial amplitude distribution E(x,y) and a(x,y) or modulation α(x,y) means a spatial amplitude distribution/modulation having only two intensity/amplitude levels in its variable regions which does not include the amplitude from any dead-space between the variable regions. Hence, a binary spatial amplitude distribution/modulation may comprise three or more intensity/amplitude levels, but in the regions in which the levels may be varied it only takes two levels. Of course each level may cover a small range of different levels owing to the finite precision of optical components and noise.

Similarly, a binary spatial phase-distribution/modulation means a spatial phase-distribution/modulation wherein parts of the phase modulated wave front is out of phase with other parts, but always with the same fixed phase shift (two phase "values"=one phase shift) Again, phase dead-space may appear between the regions in which the phase is modulated.

In the preferred embodiment according to Equation (5), it should be noticed that the amplitude modulation is not binary as such since the binary function b(x,y) is overlapped with a center-symmetric term. Thus, the amplitude modulation may be a rather complicated function if an optimized binary phase-only modulation is to be formed. However, not all amplitude modulators may be able to generate an amplitude modulation α(x,y) according to Equation (5). Also, if the amplitude modulation α(x,y) is to be dynamically controlled such as for the system to generate an animated sequence of phase modulations, continuously calculating values of α(x,y) for all pixels may require high processing speeds.

Thus, in another preferred embodiment, a binary phase-only modulation may be performed using an at least substantially binary spatial amplitude modulation α(x,y), whereby a phase-modulated wave front is generated with an at least substantially binary phase-modulation.

In this preferred embodiment, the binary spatial amplitude modulation α(x,y) should be adjusted in relation to the filter function $H(f_x,f_y)$ or vice versa, using the following steps:

determining an aperture fraction η being a ratio between a size of the central part of the spatial filter and a size of the zero order component of the Fourier or Fresnel transformed amplitude-modulated wave front $\tilde{a}(f_x,f_y)$ at the position of the spatial filter, determining a parameter K(η) expressing a relative amplitude of radiation within the central part of the spatial filter, where expressions for η and K(η) are specific to a spatial profile of the amplitude modulated wave front a(x,y), and adjusting the parameters η, C, Min(α(x,y)), Max(α(x,y)) and $\bar{\alpha}$ to at least substantially fulfill $$K\bar{\alpha}|C||\cos(\psi_c)| = \frac{1}{2}(\text{Max}(\alpha(x, y)) + \text{Min}(\alpha(x, y))), \quad (6)$$

in order to generate a predetermined phase-modulation arg[o(x',y')].

The predetermined phase-modulation arg[o(x',y')] has the same binary pattern as the binary phase modulation α(x,y), independently of the specific pattern and resolution of the amplitude modulation.

Equation (6) constrains the minimum, maximum, and average values of α(x,y) given the combined filter term C and the spatial profile of the wave front. Subject to these constraints, there is freedom of design for the binary function α(x,y). Alternatively, starting out with a given binary amplitude modulation α(x,y), the combined filter term C (or equivalently A, B, and θ) giving an binary phase-modulation arg[o(x',y')] may be determined using Equation (6) and knowing the spatial profile of the wave front. The system according to this preferred embodiment does not perform a pure phase-only modulation. The amplitude |o(x',y')| of the resulting wave front does comprise small deviations from constant amplitude corresponding to the binary amplitude modulation α(x,y). The deviations is a result of having approximated the full effect of the SRW g(r') (which follows from diffraction effects in the truncation) by a simpler expression allowing a "pure" binary phase modulation. Still, these amplitude variations are very small compared to the typical errors and noise inherent in prior art POSLMs. It is important to note that the performed binary phase modulation is as optimal as for the case where the full SRW was considered, since here the modulation is not a pure phase-only.

In systems applying typical spatial profiles of the wave front, the aperture fraction η may be determined according to $$\eta = \gamma \frac{\Delta s \cdot \Delta s_f}{\lambda \cdot F}, \quad (7)$$

where Δs is a size of the amplitude-modulated wave front a(x,y), $\Delta s_f$ is a size of the central part of the spatial filter, γ is a geometrical parameter specific to a spatial profile of the amplitude modulated wave front a(x,y), λ the wavelength of the radiation, and F is the Focal length of the Fourier or Fresnel transformation. Still, η is ultimately determined by a geometrical parameter specific to a spatial profile, however, Equation (7) provides an understanding of the behavior of η in terms of other variable parameters of the system.

The amplitude modulated wave front a(x,y) and the central part of the spatial filter of a specific system may have any of a large number of different spatial profiles, such a spatial profile selected from the group consisting of triangular, rectangular, quadratic, rhombic, pentagonal, hexagonal, circular, ellipsoidal, etc. The spatial profile of the amplitude modulated wave front a(x,y) may be defined by truncating the input wave front. The spatial profile or shape of the central part of the spatial filter is typically defined by the fabrication of the filter, and is typically chosen to match the spatial profile of the wave front.

In an appendix to the present application, the derivation of η, K(η), and γ is shown for the specific example of a circular spatial profile. Given this derivation, it is within the abilities of the person skilled in the art to find how the values of η, K(η), and γ are determined for a system having a given spatial profile.

In still another preferred embodiment, the amplitude modulated wave front a(x,y) and the central part of the spatial filter have an at least substantially circular spatial profile, and the parameters η and K(η) may be determined η and K(η) according to $$\eta = \frac{1}{0.61} \frac{\Delta r \cdot \Delta r_f}{\lambda \cdot F}, \quad (8)$$

where Δr is the radius of the amplitude-modulated wave front a(x,y) and $\Delta r_f$ is the radius of the central part of the spatial filter, and $$K = 1 - J_0(1.22\pi\eta), \quad (9)$$

here $J_0$ is the zero'th order Bessel function.

In a further preferred embodiment, a multi-valued or analogue phase modulation may be performed using a multi-valued or analogue (or grey-scale) spatial amplitude modulation α(x,y). Applying an analogue amplitude modulation will generate a corresponding analogue phase modulation in the resulting wave front. However, in this case, all parts of the resulting amplitude modulation may not be generated with the same amplitude, and the modulation will not be phase-only. To generate a constant amplitude distribution for the phase modulated wave front, the resulting amplitude modulation |o(x',y')| may be counterbalanced using a second amplitude modulator.

Thus, according to the further preferred embodiment, the spatial amplitude modulation α(x,y) has three or more different values, and the method further comprises the step of, after the inverse Fourier transformation or the inverse Fresnel transformation, performing a spatial amplitude modulation $\alpha_2(x',y')$ on the phase modulated wave front o(x',y') using a second deflecting and/or absorbing device, in order to generate an at least substantially constant amplitude distribution in the phase modulated wave front o(x',y').

In a system according to the preferred embodiments described in relation to Equation (5) through (9), the amplitude modulator and/or the spatial filter are preferably adapted to be controlled according to the adjustment of α(x,y) and/or $H(f_x,f_y)$. Hence, any controller, holding means or electronic processing means are adapted to control, hold, or calculate the values of α(x,y) and/or $H(f_x,f_y)$ according to the relevant equation.

BRIEF DESCRIPTION OF THE DRAWINGS

FIG. 6A shows a binary amplitude modulation α(x,y) used in a numerical modeling of the embodiment shown in FIG. 3. FIG. 6B shows the amplitude and phase distribution of the wave front o(x',y') resulting from the numerical modulation, FIG. 7A shows an amplitude modulation α(x,y) used in a numerical modeling of an embodiment wherein α(x,y) is optimally adjusted in relation to the filter function $H(f_x,f_y)$. FIG. 7B shows the amplitude and phase distribution of the wave front o(x',y') resulting from the numerical modulation.

DETAILED DESCRIPTION

Figure 1:
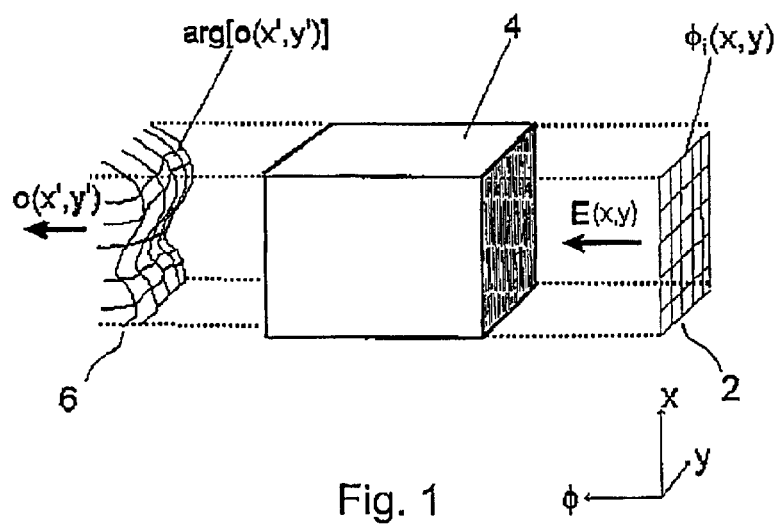
FIG. 1 shows an overview of a spatial phase modulating system according to the present invention.

FIG. 1 shows an overview of a spatial phase modulating system 4 according to the present invention. The system receives an input wave front 2, E(x,y) having a spatial phase distribution φ(x,y). The spatial phase distribution φ(x,y) shows the relative phase of different parts of the wave front as deviations from the "zero phase shift plane" according to the inserted coordinate system. Thus the spatial phase distribution φ(x,y) of the input wave front 2 is a flat or constant distribution meaning that the whole wave front is in phase.

The spatial phase modulating system 4 performs various modulations and transformations to provide a phase-modulated output wave front 6, o(x',y'), having an amplitude |o(x',y')| and a spatial phase distribution arg[o(x',y')]. As can be seen in FIG. 1, the spatial phase distribution arg[o(x',y')] is markedly different from φ(x,y) of the input wave front. Whereas φ(x,y) was flat or constant, arg[o(x',y')] has variations in the spatial phase distribution meaning that different parts of the wave front is phase shifted. Whether the central parts have had a negative phase shift or the edge parts have had a positive phase shift can not be read from the spatial phase distribution. The mesh in the phase distributions makes it possible to show the variations in the phase distribution and does not necessarily imply a pixilated phase modulation.

Figure 2:
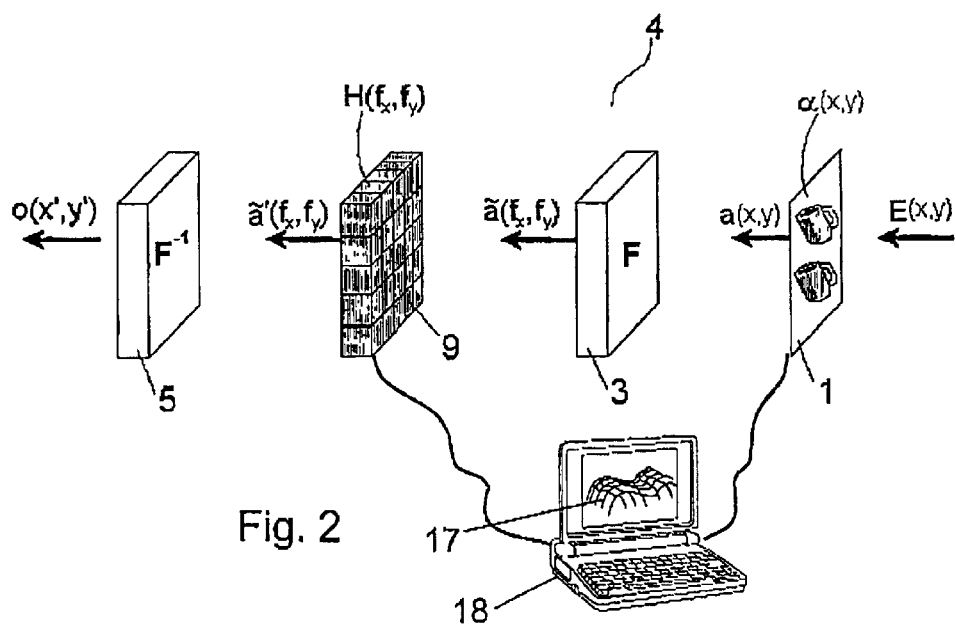
FIG. 2 is an illustration of the basic components of a spatial phase modulating system according to the present invention.

FIG. 2 shows an implementation of the spatial phase modulating system 4 of FIG. 1, which also shows the designation of the wave front at different stages in the system. The system illustrated in FIG. 2 comprises a device 1 for modulation the amplitude of the incoming wave front E(x,y) by deflecting or absorbing parts of the incoming wave front to generate an amplitude modulated wave front a(x,y), means 3 for Fourier or Fresnel transforming the amplitude-modulated wave front, a spatial filter 9 for phase shifting and/or damping one or more components of the Fourier or Fresnel distribution $\bar{a}(f_x,f_y)$ and means 5 for inverse Fourier or inverse Fresnel transforming the filtered wave front $\bar{a}(f_x,f_y)$ to generate a phase modulated wave front o(x',y'). In FIG. 2, all components are shown as transmitting components, however, the spatial phase modulating system 4 can be implemented with one or more or all components being reflective components.

The amplitude modulator 1 for modulation of the amplitude of the incoming wave front E(x,y) performs a spatially continuous or a pixilated amplitude modulation α(x,y) to generate a phase modulated wave front a(x,y). A spatially continuous amplitude modulation can e.g. be generated by a transparent film with a picture, similarly an LCD display or another ASLM can generate a pixilated amplitude modulation. If the loss of light in the spatial phase modulating system 4 is to be minimized, the amplitude modulator 1 can amplitude modulate the wave front without totally extinction of any parts of the wave front (except at potential dead-space in ASLMs) by generating various nonzero amplitude levels. This would compare to a transmitting device with only grayscale parts and no non-transmitting parts, or a reflecting device having parts of different reflectivity and no non-reflecting parts.

Different spatial parts of the spatial filter 9 are not related to corresponding spatial parts of the amplitude-modulating amplitude modulator 1. Instead, the spatial filter 9 modulates components of the Fourier or Fresnel distribution $\bar{a}(f_x,f_y)$ spatial frequencies of the amplitude distribution a(x,y). Thus, the effect of the amplitude modulation generated by the amplitude modulator 1 and the filtering of the spatial filter 9 is only indirectly related.

The spatial filter 9 can phase shift and/or damp individual components of the Fourier or Fresnel distribution $\bar{a}(f_x,f_y)$ and thereby affect the phase modulation of the resulting wave front. The phase filter can be continuous or pixilated and can be embodied by all devices for phase shifting and/or damping EM radiation. A large number of devices are known, e.g. a phase contrast filter or a combination of a standard POSLM and a standard ASLM. However, as follows from the previous section, the resolution of the spatial filter does not establish the resolution of the resulting phase modulation as the amplitude-modulating amplitude modulator 1 determines this. Hence, the resolution of any pixilated spatial filter is typically much lower than the resulting phase modulation which makes the spatial filter 9 a much simpler and cheaper device than standard phase modulating devices and constitutes one of the major advantages of the present invention.

In order to produce a predetermined phase output or perform a predetermined phase modulation, the amplitude modulation α(x,y) and the spatial filtering H(f_x,f_y) typically has to be co-coordinated.

The amplitude modulator 1 can be a fixed amplitude modulator such as a photographic film or a transparency with an illustration such as printed computer graphics. However, in a preferred embodiment, the amplitude modulator 1 and possibly also the spatial filter 9 can be dynamically controlled by a computer 18 in order to provide the co-ordination of the amplitude modulation and the spatial filtering. The computer 18 can calculate appropriate values for α(x,y) and H(f_x,f_y) and thereafter address the amplitude modulator 1 and possibly also the spatial filter 9, transmitting a signal for controlling the values of α(x,y) and H(f_x,f_y) for these devices. This would allow for the same system to perform a large variety of phase modulations 17. In some cases, some parameters of the amplitude-modulating amplitude modulator 1 are substantially constant whereby the spatial filter will be the same for a variety of different phase modulations. In such cases, the spatial filter 9 can be a fixed filter (not dynamically controllable) which provides improved simplicity and costs.

Figure 3:
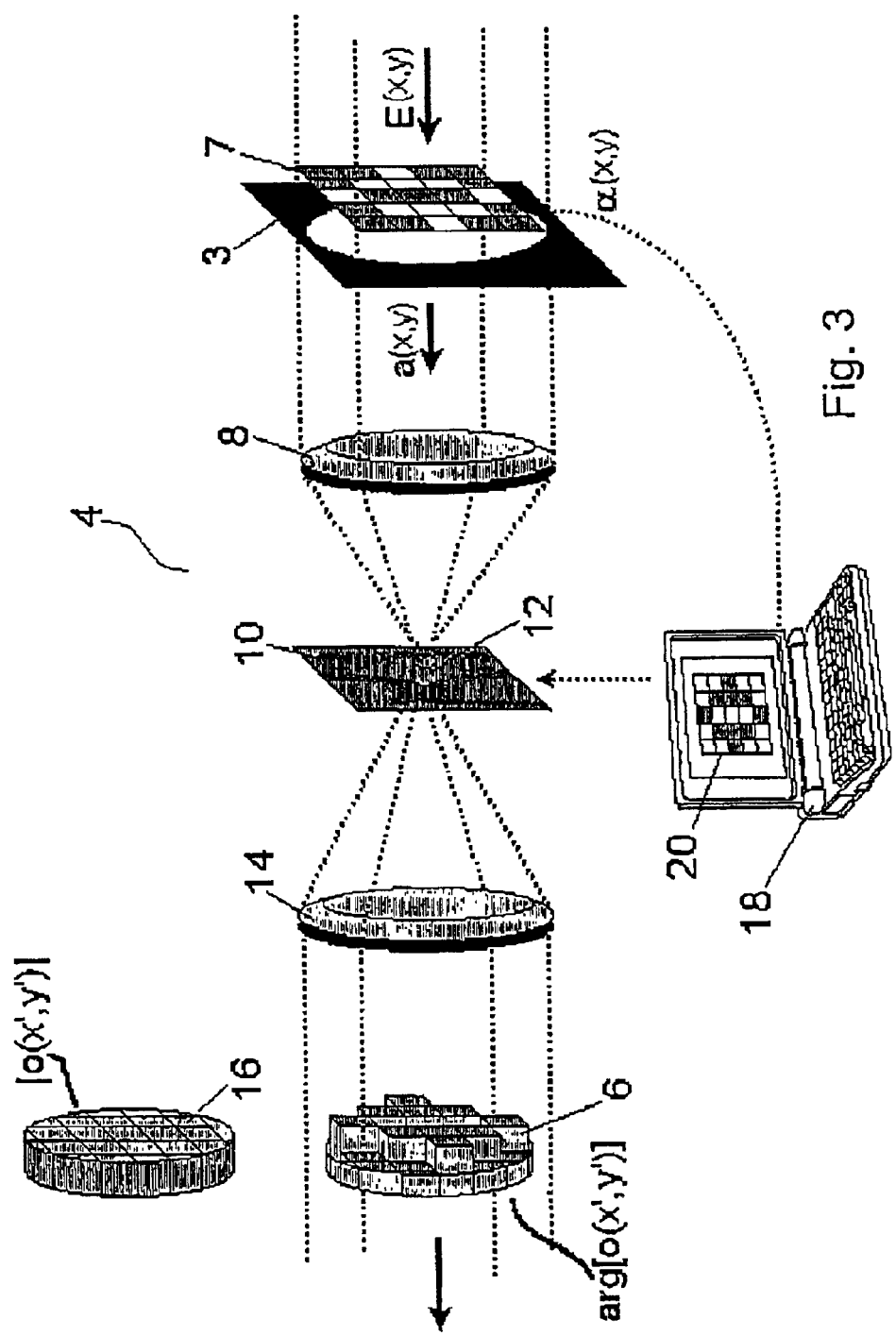
FIG. 3 is a schematized set-up of a binary phase modulating system according to the present invention.

In a preferred embodiment shown in FIG. 3 and previously described in relation to Equation 6, a system 4 provides a binary phase modulation of an incoming wave front yielding a binary phase distribution arg[o(x',y')] 6 of an output wave front by a filtering operation in the Fourier plane.

As shown in FIG. 3, a transmitting amplitude-modulating device 7 receives the incoming wave front and performs the amplitude modulation α(x,y). An iris or aperture 3 truncates the amplitude modulated wave front to define a circular spatial profile and emit the truncated amplitude modulated wave front towards the Fourier lens 8. The circularly truncated amplitude modulated wave front can be expressed as $$\alpha(x,y) = \text{circ}(r/\Delta r)\alpha(x,y). \quad (10)$$

The device 7 is an ASLM controlled by a controller such as a computer 18 to perform a binary spatial amplitude modulation α(x,y) according to a binary spatial amplitude distribution 20. Here, the first lens 8 performs a Fourier transformation forming a Fourier distribution of the wave front and the second lens 14 performs an inverse Fourier transformation of the filtered Fourier distribution.

In the embodiment shown in FIG. 3, the zero-order component of the Fourier distribution is filtered in a zero-order spatial filter 10 in relation to all other components of the of the Fourier distribution. A central part 12 of the filter 10 induces a phase shift in the zero-order component transmitted by this part in relation to the other components. The central part 12 is circular corresponding to the truncation of the wave front. Also, the central part 12 can dampen the zero-order component in relation to the other components, or similarly, the spatial filter 10 damps all components except for the zero-order component transmitted by the central part 12. The zero-order spatial filter 10 can be described by the filter function $H(f_x, f_y)$, which comprises the combined filter term $$C = \left[\frac{B}{A}e^{i\theta} - 1\right] = |C|e^{i\Psi_c},$$

where A is the transmittivity (zero transmission A=0, transparent A=1) of the part of the spatial filter receiving the components of the Fourier distribution having an order larger than 0, B is the transmittivity (zero transmission B=0, transparent B=1) of the part of the spatial filter receiving the zero-order component of the Fourier distribution, the central region 12, and $\theta$ is the phase shift of the zero order component in relation to the components of the Fourier distribution having an order larger than 0.

The co-ordination of the amplitude modulation $\alpha(x,y)$ and the combined filter term C are performed according to Equation (6):

$$K\overline{\alpha}|C||\cos(\psi_c)| = \frac{1}{2}(\text{Max}(\alpha(x, y)) + \text{Min}(\alpha(x, y))), \quad (6)$$

when $\eta$ and $K(T\eta)$ are known.

Figure 4:
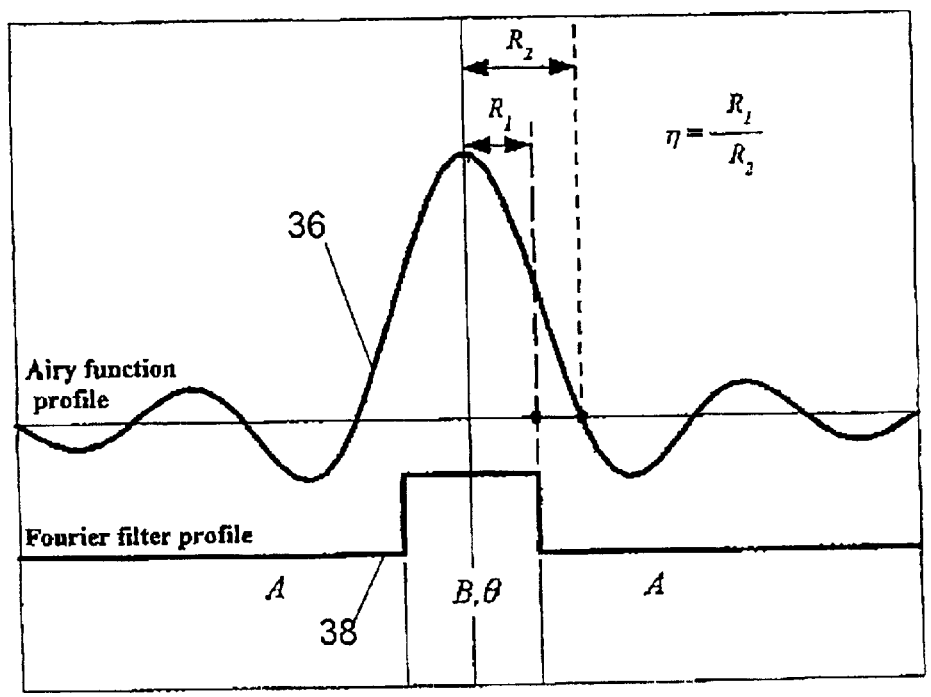
FIG. 4 is a graph illustrating the method of determining of an aperture fraction η for a system having a circular aperture/spatial profile.

FIG. 4 illustrates $\eta$ in the case of a circularly truncated beam, $\theta$ is a relationship between the profile of the diffracted Airy function resulting from the Fourier transform of the circularly truncated input aperture, curve 36, and the spatial profile of the zero-order phase-filter 10, curve 38. The term $\eta$ is defined as the ratio of the radii of the filter, $R_1$, and the main lobe of the Airy function, $R_2$, and can be determined from the physical parameters of the system 4 by $$\eta = \frac{R_1}{R_2} = \frac{1}{0.61} \frac{\Delta r \cdot \Delta r_f}{\lambda \cdot F}, \quad (8)$$

where $\Delta r$ is the radius of the aperture 3, $\Delta r_f$ is the radius of the central part 12, $\lambda$ is the wavelength of the light, and F is the focal length of the lens 8. In Equation 6, the function g(r) counterbalancing the distortions represented by the SRW g(r') has been approximated by the previously mentioned Equation (9):

$$K = 1 - J_0(1.22\pi\eta), \quad (9)$$

where $J_0$ is the zero'th order Bessel function. This will be dealt with in detail in the appendix.

Typically, A and B are either 0 or 1 whereas $\theta$ typically takes values equal to a fraction of $\pi$, $\pi/\eta$, however, any value may be used. The spatial filter 10 can be operationally connected to a controller such as a computer 18 for dynamically controlling the parameters A, B and $\theta$ in relation to the amplitude modulation $\alpha(x,y)$ in order to provide a phase modulation corresponding to the amplitude modulation $\alpha(x, y)$. However, since these parameters typically only takes a few chosen values, the system 4 can also be operated manually or automatically.

An important feature of the embodiment shown in FIG. 3 is that the resulting wave front has a substantially "flat" amplitude distribution 16 as illustrated in FIG. 3—thus the amplitude modulation performed by the device 7 translates into a phase modulation 6 having a substantially constant amplitude across the wave front. The amplitude distribution 16 of the resulting wave front does not have a residual amplitude pattern corresponding to dead-space from addressing electronics in the amplitude modulating device 7, however, the amplitude dead space pattern translates into a pattern of passive transmission (no phase modulation) in the resulting phase distribution 6. Thus, dead-space in the amplitude modulating device 7 only results in a "phase dead space" pattern in the phase distribution 6 in the wave front. The phase dead space pattern is an improvement of existing transmitting POSLMs which have both amplitude and phase dead space. The phase dead space pattern can be reduced or removed by using a reflective amplitude modulating device having the addressing electronics on the backside and thereby little or no amplitude dead space.

Figure 5:
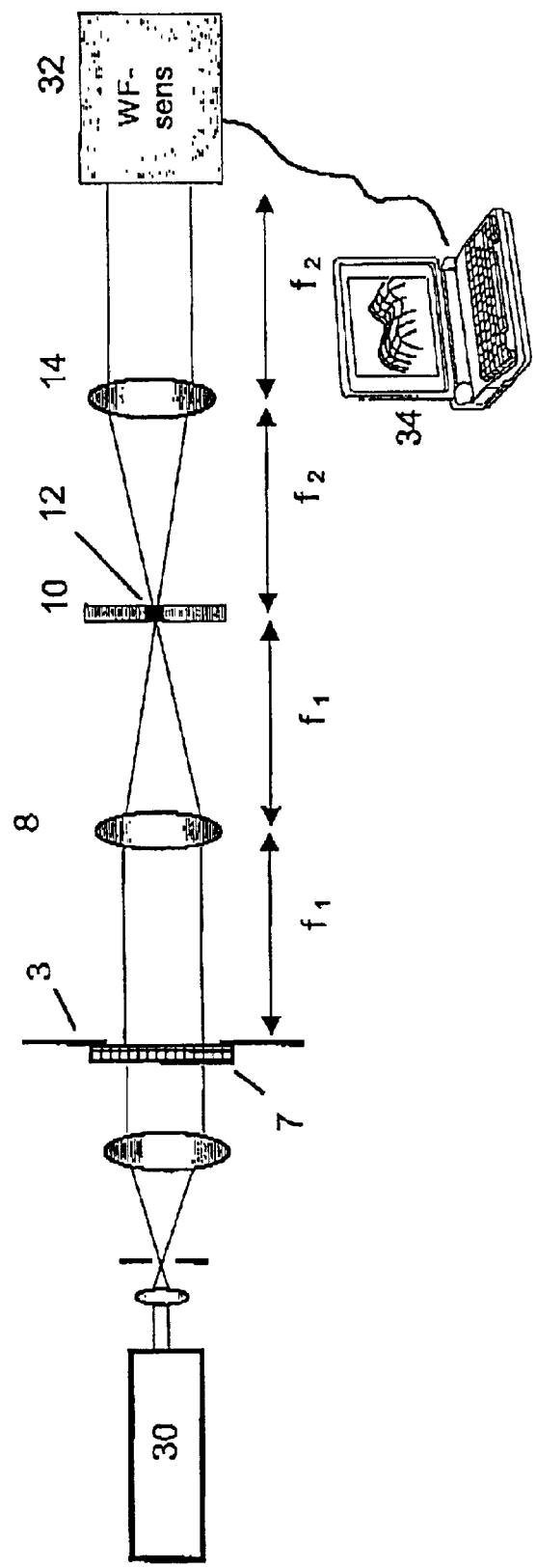
FIG. 5 is a detailed set-up of an implementation of the preferred embodiment of FIG. 3, which also provides detection of the phase modulation.

The preferred embodiment of the phase modulating system 4 described in relation to FIG. 3 has been implemented in a simple experiment using standard optical components. FIG. 5 shows the optical set-up of this implementation which also provides detection of the phase modulation. The implementation only serves as a qualitative illustration and does not provide a fully optimized performance of a phase modulating system according to the present invention.

FIG. 5 shows the basic set-up comprising the amplitude-modulating device 7, aperture 3, achromatic doublet lenses 8 and 14, and the zero-order spatial filter 10 in a 4F configuration. A laser source 30 emits a collimated laser beam at 633 nm which is expanded in expander 40 to a beam diameter of 10 mm. The iris 3 has an aperture of 5 mm and is positioned between the amplitude-modulating device 7 and the first Fourier lens 8. The Fourier lenses 8 and 14 have focal lengths $F_1 = F_2 = 200$ mm, however, 14 will often have a larger focal length in order to introduce a magnification of output given by $F_2/F_1$. The spatial filter 10 is positioned in the Fourier plane between the lenses. The size of the circular central part 12 transmitting the zero-order component of the Fourier distribution is in the range 20–100 pm but is typically chosen in relation to the size of the aperture 3 in order to achieve an appropriate overlap as expressed by $\eta$. The spatial filter has parameters A=B=1, which indicates a loss less filter, and $\theta=\pi$.

The phase modulation can be detected by a variety of detectors. In a simple set-up, the system 4 is positioned in a Mach-Zehnder interferometer which forms an interference pattern between the initial wave front E(x,y) and the phase modulated wave front o(x',y'). The resulting interference pattern will show displacements corresponding to the phase modulation. Alternatively, the phase modulations can be detected in a phase detector or wave front sensor 32, e.g. a Shack-Hartmann wave front sensor.

The phase modulation performed in the system described in relation to FIG. 3 or 5 have been simulated in a complete numerical modeling. The modeling includes aperture truncating effects at the input and in the filter plane (i.e. the influence of SRW curvature according to Equation (A7) of the Appendix). A loss less $\pi$-phase shifting filter was applied with aperture fraction $\leftarrow = 0.4$. The curvature pre-distortion from g(r') has been disregarded, whereby g(r') can be approximated by $K(\eta)$ of Equation (9), making it much simpler to encode the input. The amplitude distribution pre-coded according to Equation (6), which for the loss less filter can be further simplified to:

$$K\overline{\alpha}|C|^2 = \text{Max}(\alpha(x,y)) + \text{Min}(\alpha(x,y)) \quad (11)$$

FIG. 6A shows a cross-section plot of the binary amplitude modulation $\alpha(x,y)$ and FIG. 6B shows cross-section plots of the amplitude $|o(x',y')|$ and phase $\arg[o(x',y')]$ of the phase modulated wave front resulting from a complete numerical FFT-modeling of the optical system.

The price to pay for disregarding the full influence of the SRW $g(r')$ can be seen in the amplitude plot $|o(x',y')|$ of FIG. 6B where the output amplitude profile now has a slight curved and rippled shape instead of being perfectly flat (in particular at the edges of the aperture). As expected there is no impact on the oscillating phase which is extremely robust in the case where a loss less π-phase shifting filter is applied.

Another simulation has been performed wherein the full influence of the SRW $g(r')$ have been regarded. Again, the modeling includes aperture truncating effects at the input and in the filter plane (i.e. the influence of SRW curvature according to Equation (A7) of the Appendix). A loss less π-phase shifting filter was applied with aperture fraction η=0.4. By regarding the full influence of the SRW $g(r')$ means that the preceding of α(x,y) have been performed according to Equation (5)

$$\alpha(x, y) = b(x, y) + \bar{b}\left[\frac{1}{2} - \bar{g}\right]^{-1} g(r) \quad (5)$$

$g(r)$ is a function which counterbalancing the effects represented by a synthetic reference wave $g(r')$ of the system, and $\bar{g}$ is the average value of $g(r)$. Figuratively, $g(r)$ can be seen as determined by taking an imaginary output wave front, without the effects represented by $g(r')$, and track it back through system to determine the distortions of the systems to be counterbalanced by $g(r)$.

FIG. 7A shows a cross-section plot of the amplitude modulation α(x,y). The plot clearly indicates the influence of a curvature term (see second term of Equation (A15) of the Appendix) giving rise to a curved envelope function superposed the original binary amplitude sequence to generate the precise amount of pre-distortion to counteract the influence of aperture effects in a real optical system implementation.

FIG. 7B shows cross-section plots of the amplitude $|o(x', y')|$ and phase $\arg[o(x',y')]$ of the phase modulated wave front, and shows the desired binary oscillating phase readout (measured in radians) and the perfectly flat amplitude output profile.

Figure 8:
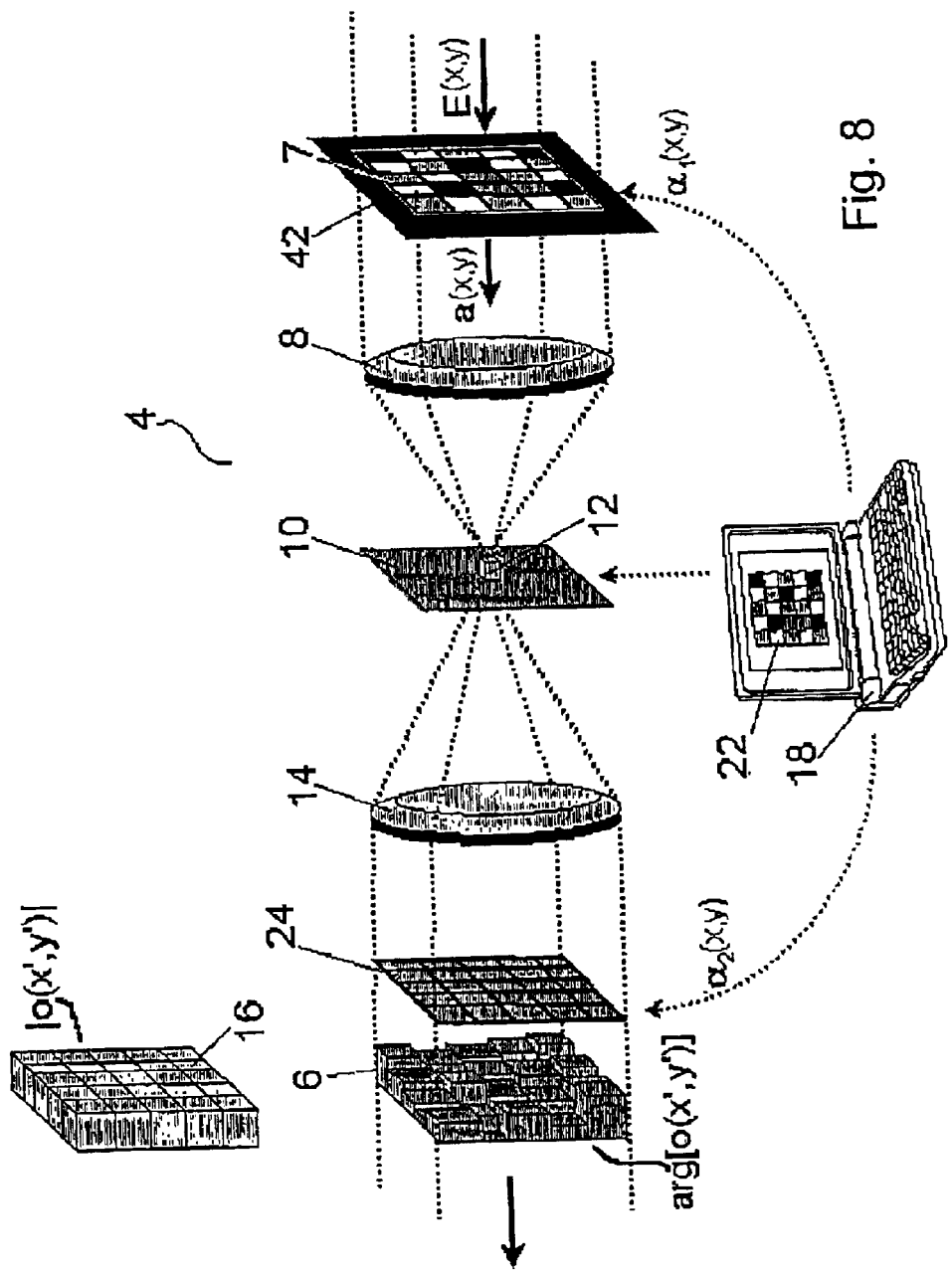
FIG. 8 is a schematized set-up of a multi-valued/analogue phase modulating system according to the present invention.

In another preferred embodiment shown in FIG. 8, a system 4 provides a multi-valued or analogue phase modulation of an incoming wave front yielding a multi-valued/analogue phase distribution $\phi_f(x,y)$ 6 of an output wave front by a filtering operation in the Fourier plane.

As shown in FIG. 8, a transmitting amplitude-modulating device 7 receives the incoming wave front, performs the amplitude modulation and emits the amplitude modulated wave front towards the Fourier lens 8. The device 7 is an ASLM controlled by a controller such as a computer 18 to perform a multi-valued/analogue/grayscale spatial amplitude modulation $\alpha_1(x,y)$ according to a multi-valued/analogue/grayscale spatial amplitude distribution 22. The input wave front is quadratically truncated according to the aperture 42 defined by the edges of the phase modulator. The first lens 8 performs a Fourier transformation forming a Fourier distribution of the wave front and the second lens 14 performs an inverse Fourier transformation of the filtered Fourier distribution. The zero-order component of the Fourier distribution is filtered in a zero-order spatial filter 10 similar to the spatial filter described in relation to FIG. 3. However, in the embodiment of FIG. 8, the central part 12 is quadratic since the spatial profile of the wave front, and thereby the shape of the zero-order component, is quadratic.

Applying an analogue amplitude modulation will generate a corresponding analogue phase modulation in the resulting wave front. However, in this case, all parts of the resulting amplitude modulation can not be generated with the same amplitude, and the modulation will not be phase-only. To generate a constant amplitude distribution for the phase modulated wave front, the resulting amplitude modulation $|o(x',y')|$ can be counterbalanced using a second amplitude modulator.

Hence, in order for the resulting wave front to have a "flat" amplitude distribution 16 as illustrated in FIG. 8, a second amplitude modulation $\alpha_2(x',y')$ can be performed by a second amplitude-modulating device 24 inserted after the second lens 14. As shown, the second amplitude-modulating device 24 is preferably dynamically controlled in relation to the amplitude modulation $\alpha_1(x,y)$ of the first amplitude-modulating device 7 by the computer 18.

Figure 11:
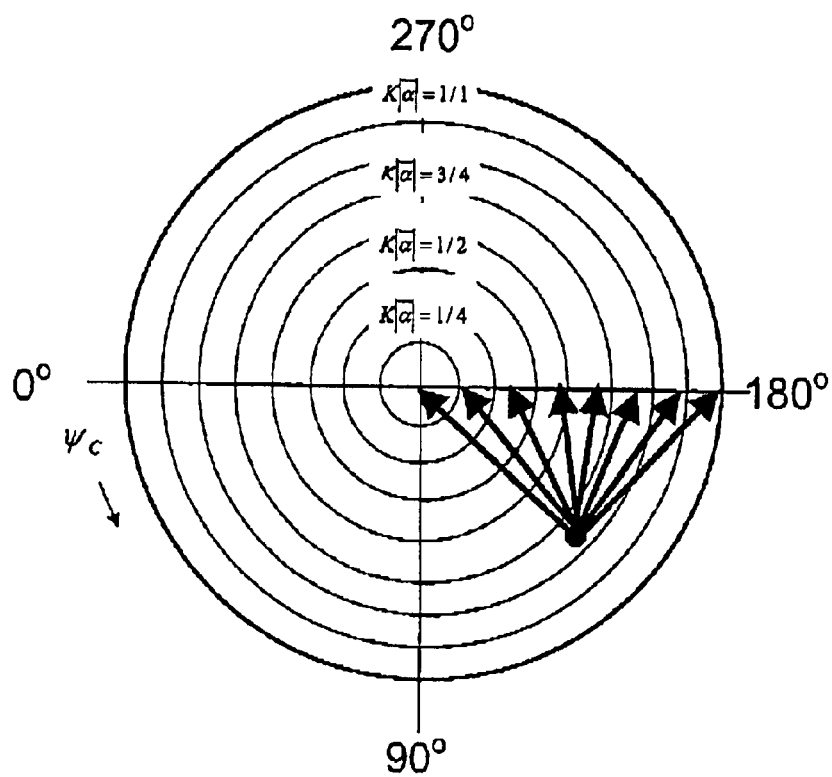
FIG. 11 shows a phasor chart for the embodiment shown in FIG. 8.

The method for co-coordinating the amplitude modulations $\alpha_1(x,y)$ and $\alpha_2(x',y')$ and the parameters of the filter function $H(f_x,f_y)$ in this preferred embodiment will be described in relation to FIG. 11. Typically, A and B are either 0 or 1 whereas θ typically takes values equal to a fraction of π, π/η, however, any value may be used. The spatial filter 10 can be operationally connected to a controller such as a computer 18 for dynamically controlling the parameters A, B and θ in relation to the amplitude modulations $\alpha_1(x,y)$ and $\alpha_2(x',y')$ in order to provide a phase modulation corresponding to the amplitude modulation $\alpha_1(x,y)$. However, since these parameters typically only takes a few chosen values, the system 4 can also be operated manually or automatically.

In planar optics the whole optical system is integrated monolithically in a single substrate. The optics is folded into a two-dimensional geometry making the implementation compatible to the fabrication techniques used for the processing of integrated circuits. Accordingly, it is also possible to use surface-mounted opto-electronic components on the substrate surfaces. The surfaces of the substrate including the optical components are coated with a metallic or dielectric layer to keep the zigzag reflected light inside the substrate. The technology provides for miniaturization (in the centimeter-range), robustness (insensitive to environmental influences such as dust and humidity) and replication methods for mass production.

It is often a complicated task to obtain an overview of the output from a system like that shown in FIG. 3 or 8, for a given input amplitude distribution and the set of filter parameters (A, B, θ). In this section, we briefly describe a graphical phasor-chart method for system analysis and how to apply this technique to specific examples.

For the majority of cases we are working directly with the combined filter parameter, $$C = \left[\frac{B}{A}e^{i\theta} - 1\right] = |C|e^{i\Psi_C},$$

obtained from Equation (A21) of the Appendix, and we would accordingly like the graphical phasor chart to work with this parameter as well.

Figure 9:
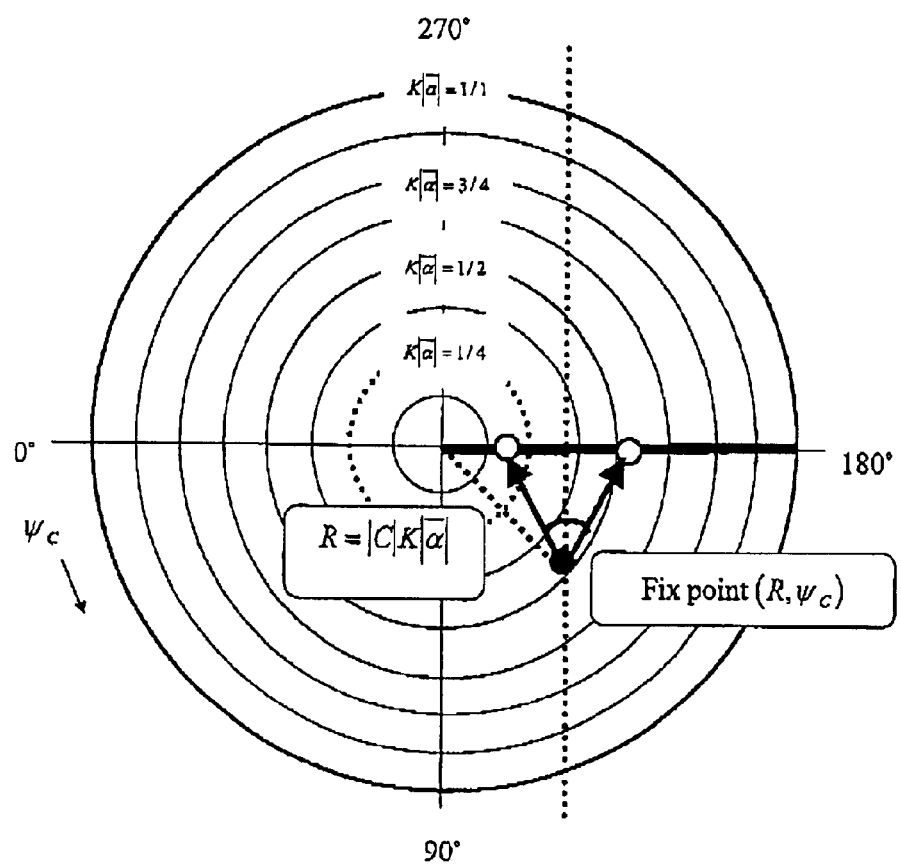
FIG. 9 shows a basic layout of the graphical phasor chart for illustrating the output of a given system according to the present invention.

FIG. 9 shows the basic layout of the graphical phasor chart for mapping a real-valued positive input amplitude (indicated on the thick line on the x-axis) to an output phase and amplitude for a set-up with Fourier filter parameters (A, B, θ) combined into the single complex filter parameter $C=|C|e^{i\Psi_C}$. The key elements of the chart are labeled for clarity. A noticeable feature in this chart is that all $K|\bar{\alpha}|$ circles are arranged concentrically within a unity phase circle. The phase of the combined filter parameter, $\Psi_C$, is measured about the center point of the circles with the scale shifted by 180°. The radial scaling for the position of the indicated 'read-out' fix point simply depends on the factor |C|, resulting in a radial parameter, R, in the coordinate system given by R=|C|K|α|.

Figure 10A:
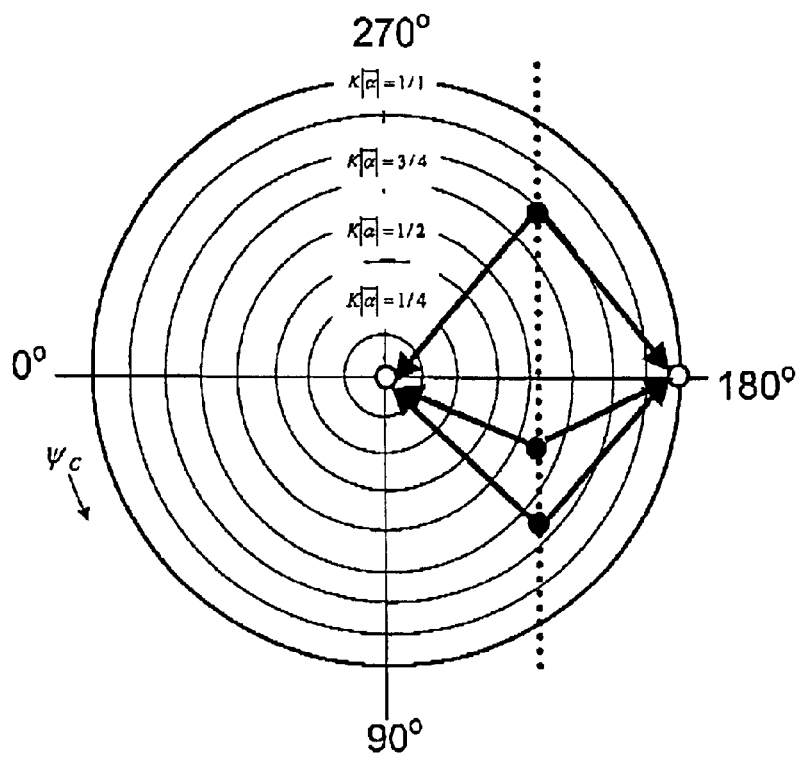
FIGS. 10A–D shows a phasor chart for a number of specific systems.
Figure 10B:
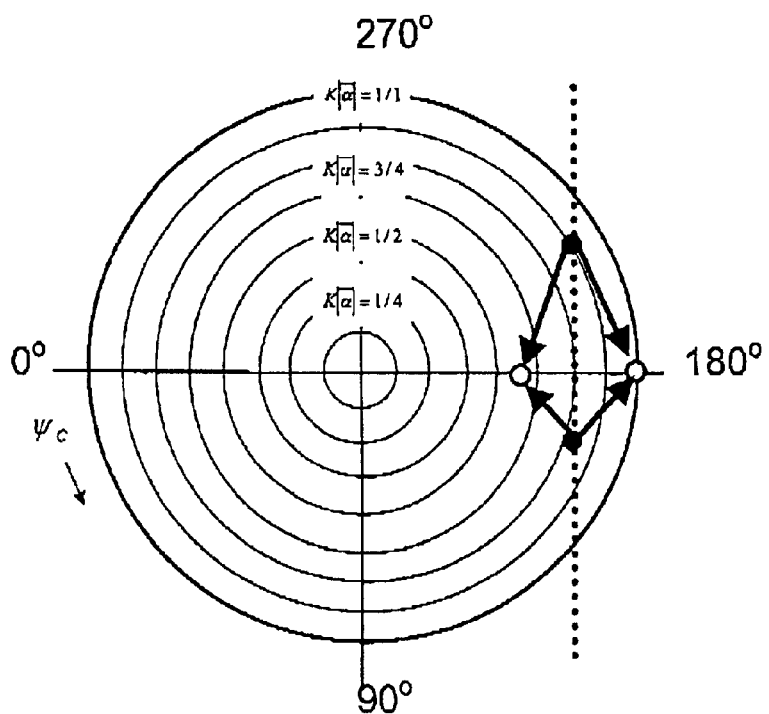

The phasor chart of FIG. 10A shows an example of the use of the chart to obtain different binary phase and amplitude outputs for the same binary valued amplitude input 0/1, whereas FIG. 10B shows an example with binary input where smallest input value is larger than 0.

Figure 10C:
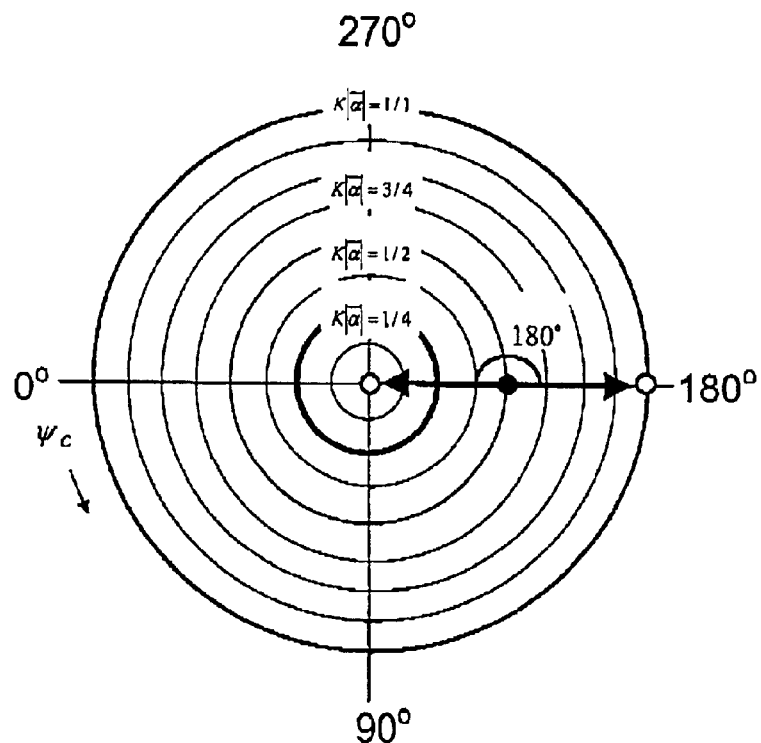
Figure 10D:
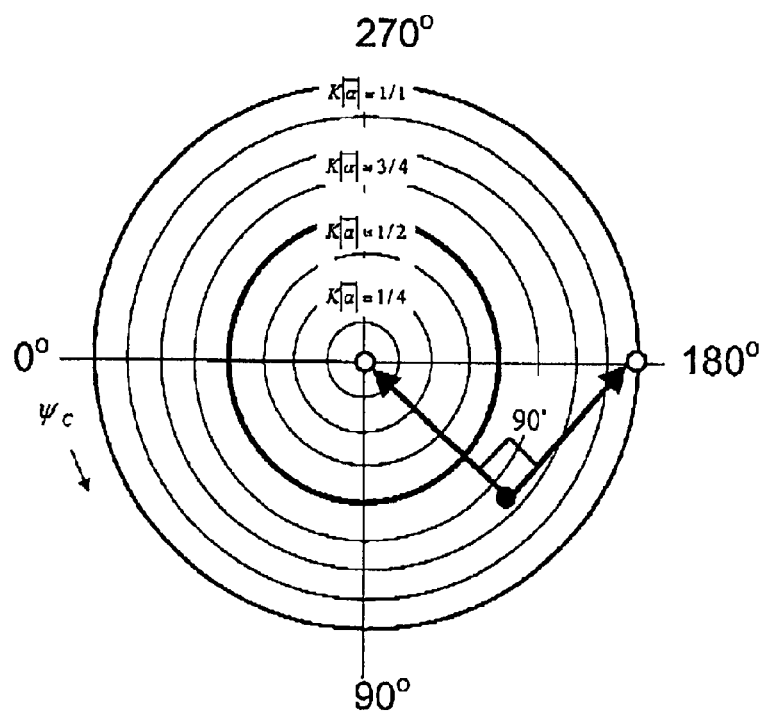

FIG. 10C shows a phasor chart with following parameters: $\overline{K\alpha}=\frac{1}{4}$ and C=|C|exp(i$\psi_C$)=−2, identical to the parameters used in the embodiment described in relation to FIG. 4 generating a 180° binary phase pattern. The phasor chart of FIG. 10D shows a phasor chart with following parameters: $\overline{K\alpha}=\frac{1}{2}$ and C=|C|exp(i$\psi_C$)=√2exp(i3π/4), used for generating a 90° binary phase pattern.

In the embodiment for generating a multi-valued or analogue phase modulation, described in relation to FIG. 8, a second amplitude modulation $\alpha_2(x,y)$ should be performed in order to counterbalance the amplitude modulation remaining in the generated wave front. The value of $\alpha_2(x,y)$, or equivalently the value of $\alpha_2(x,y)$ for each pixel (x,y) in the second phase modulator 24 can be determined using a phasor chart illustrating the situation when an analogue input (multiple input grey levels) is applied. Such phasor chart is illustrated in FIG. 11.

As is illustrated by the different length of the arrows, a non-uniform amplitude distribution directly related to the input addressing grey level length of the arrows is the price to pay for obtaining multiple phase shifts. This can be easily compensated for by using a second amplitude modulator truncating all amplitudes to the same value while keeping the analogue phase values as the desired output. The second amplitude modulation should equalize the lengths of the arrows by damping all the "peaks" in the amplitude distribution to the level of the shortest arrow.

The present invention has a large number of applications. It may be used as replacing POSLMs in all the applications of such device, e.g. for:

Converting digital amplitude patterns into digital phase patterns for efficient holographic data storage.

Generating holographic multiplexing of multiple patterns based on phase-coding.

Generating phase patterns or phase keys for accessing phase encrypted spatial information.

Generating phase patterns for defocusing tests.

In general, the present invention can advantageously be applied where a high quality dynamic spatial phase modulation is required—e.g. fully controlled by a computer interface.

Appendix

In the following, a full theoretical derivation of the expressions used to determine the values of the spatial amplitude modulation $\alpha(x,y)$ in relation to the parameters of the filter function $H(f_x,f_y)$, or vice versa, is given. The adjustment of $\alpha(x,y)$ in relation to $H(f_x,f_y)$ is serves to control the phase modulation to generate a predetermined phase-modulation o(x',y'). The output from this derivation is Equation (5) used previously to optimize the performance of the method and system according to the third and fourth aspect of the present invention, and Equation (6) and (11) providing more practically accessible approaches with high-end performance. As the exact expressions depends significantly on the beam profile of the wave front through the system, a specific input aperture in the system must be chosen when performing the derivation. However, given the present application, similar derivations for other input apertures/beam profiles is within the competence of the person skilled in the art.

Assuming a circular input aperture with radius, Δr, truncating the spatial amplitude pattern modulated onto a collimated, unit amplitude, monochromatic field of wavelength, λ, we can describe the incoming light amplitude α(x,y) by, $$\alpha(x,y)=\text{circ }(r/\Delta r)\alpha(x,y) \tag{A1}$$

at the entrance plane of the optical system using the definition that the circ-function is unity within the region, r=$\sqrt{x^2+y^2}\leq\Delta r$, and zero elsewhere.

Similarly, we assume a circular on-axis centered spatial filter of the form:

$$H(f_x, f_y) = A(1 + (BA^{-1}\exp(i\theta) - 1)\text{circ}(f_r/\Delta f_r)) \tag{A2}$$

where B∈[0;1] is the chosen filter transmittance of the focused light, θ∈[0;2] is the applied phase shift to the focused light and A∈[0;1] is a filter parameter describing field transmittance for off-axis scattered light. The spatial frequency coordinates are related to spatial coordinates in the filter plane such that: $(f_x,f_y)=(\lambda f)^{-1}(x_f,y_f)$ and $$f_r = \sqrt{f_x^2 + f_y^2}.$$

Performing an optical Fourier transform of the input field from Equation (A1) followed by a multiplication with the filter parameters in Equation (A2) and a second optical Fourier transform (corresponding to an inverse Fourier transform with inverted coordinates) we obtain an expression for the complex amplitude o(x',y') describing the interferogram at the observation plane of the 4-f set-up:

$$o(x',y')=A[\alpha(x',y')\text{ circ }(r'/\Delta r)+\overline{\alpha}(BA^{-1}\exp(i\theta)-1)g(r')] \tag{A3}$$

where g(r') is the synthetic reference wave (SRW) and the term $\overline{\alpha}$ is given by:

$$\overline{\alpha} = (\pi(\Delta r)^2)^{-1} \iint_{\sqrt{x^2+y^2}\leq\Delta r} \alpha(x, y)dxdy \tag{A4}$$

The object dependent term, $\overline{\alpha}$, corresponding to the amplitude of the focused light plays a significant role in the expression for the generated interference pattern. Of similar importance in the analysis is the term g(r') describing the spatial profile of the SRW, diffracted from the aperture formed by the on-axis centered filtering region. It is the interference between this SRW term, carrying the information about the filtering parameters, and the imaged input amplitude pattern that generates the desired output phase pattern.

To obtain an accurate description for the SRW and thereby an accurate derivation for Equation (A3) the zero-order Hankel transform is applied followed by a series expansion in the spatial dimension, r'. For a circular input aperture with radius, $\Delta r$, we can describe the radius of the corresponding central phase shifting region of the Fourier filter (characterized by the parameters B and $\theta$) in terms of a radial spatial frequency range $\Delta f_r$. We can thus obtain the following expression for the SRW by use of the zero-order Hankel transform:

$$g(r') = 2\pi\Delta r \int_0^{\Delta f_r} J_1(2\pi\Delta r f_r) J_0(2\pi r f_r) df_r \quad (A5)$$

In order to simplify the analysis, we introduce a term $\theta$, which explicitly relates the radius of the central filtering region, $R_1$, to the radius of the main-lobe of the Airy function, $R_2$, resulting from the Fourier transform of the circular input aperture. We can thus express $\theta$ in terms of $\Delta r$ and $\Delta f_r$ such that:

$$\eta = R_1/R_2 = (0.61)^{-1} \Delta r \Delta f_r \quad (A6)$$

where the factor of 0.61 arises from the radial distance to the first zero crossing of the Airy function corresponding to half of the Airy main lobe factor, of 1.22. If we make this substitution in Equation(A5) and then perform a series expansion in r', we obtain the following expression for the SRW:

$$g(r') = 1 - J_0(1.22\pi \cdot \eta) - [(0.61\pi \cdot \eta)^2 J_2(1.22\pi \cdot \eta)](r'/\Delta r)^2 + \quad (A7)$$
$$[((0.61\pi \cdot \eta)^3/4)\{2J_3(1.22\pi \cdot \eta) - 0.61\pi \cdot \eta \cdot J_4(1.22\pi \cdot \eta)\}](r'/\Delta r)^4$$

In this expansion, the SRW is expressed in radial coordinates normalized to the radius of the imaged input aperture. This can easily be scaled to allow for a magnification within the imaging system, though for the remainder of the analysis a direct imaging operation is assumed. From Equation(A7) it is apparent that the SRW will change as a function of the radius of the central filtering region. Additionally, it is clear that the SRW profile is not necessarily flat over the system output aperture.

Following these initial calculations for the spatial filtering process it is now possible to analyze the generated interference pattern in terms of amplitude/intensity and phase components.

From Equation (A3) we can easily derive an expression for the generated output intensity:

$$|o(x', y')|^2 = \quad (A8)$$
$$A^2[\alpha^2(x', y') circ(r'/\Delta r) + \overline{\alpha}^2(1 + B^2 A^{-2} - 2BA^{-1}\cos(\theta))g^2(r') +$$
$$2\overline{\alpha}(BA^{-1}\cos(\theta) - 1)\alpha(x', y')g(r')circ(r'/\Delta r)]$$

Using a loss less filter (most desirable) one can insert A=B=1 (no absorption). $\theta=\pi$ and truncating the output aperture by circ(r'/$\Delta$r) to get:

$$o(x',y') = [\alpha(x',y') - 2\overline{\alpha}g(r')] \quad (A9)$$

Given a bipolar pattern b(x',y') to be optically read-out as a spatially similar phase pattern with binary phase stepping $0/\pi$. This is obtained optically by implementing the following (positive) input amplitude function:

$$\alpha(x,y) = b(x,y) + 2\overline{\alpha}g(r) \quad (A10)$$

whereby the aim is achieved:

$$o(x',y') = |b(x',y')| \angle b(x',y') \quad (A11)$$

In Equation (A10) we have a functional dependence of $\alpha(x,y)$ on both sides of the equation ($\overline{\alpha}$ is the average of $\alpha(x,y)$ calculated by Equation (A4)). One therefore needs a way to remove this interdependence to be able to code $\alpha(x,y)$ on the input side of the system.

By taking the spatial average value on both sides of Equation(A10) and re-ordering terms one finds:

$$\overline{\alpha} = \overline{b}[1 - 2\overline{g}]^{-1} \quad (A12)$$

where $$\overline{g} = 2(\Delta r)^2 \int_0^{\Delta r} rg(r)dr \quad (A13)$$

and $$\overline{b} = (\pi(\Delta r)^2)^{-1} \iint_{\sqrt{x^2+y^2} \leq \Delta r} b(x,y)dxdy \quad (A14)$$

Combining these equations one finally obtains a directly applicable expression for coding of the input amplitude function $\alpha(x,y)$:

$$\alpha(x, y) = b(x, y) + \overline{b}\left[\frac{1}{2} - \overline{g}\right]^{-1} g(r) \quad (A15)$$

with bounding range on the binary function b(x,y):

$$\begin{cases} \text{MIN}(g(r))\left[\frac{1}{2} - \overline{g}\right]^{-1} \overline{b} \geq |b| > 0 \\ \text{MAX}(g(r))\left[\frac{1}{2} - \overline{g}\right]^{-1} \overline{b} \leq [1 - |b|] \end{cases} \quad (A16)$$

and $$\begin{cases} \overline{g} < \frac{1}{2} \Rightarrow \overline{b} > 0 \\ \overline{g} > \frac{1}{2} \Rightarrow \overline{b} > 0 \end{cases} \quad (A17)$$

Even though there are two choices of regions for $\overline{g}$ according to Equation (A17) it is most desirable to select within the region $\overline{g} < \frac{1}{2}$ due to reduced curvature of the SRW profile for this region.

Combining the two expressions in Equation(A16) one obtains:

$$\begin{cases} \left[\frac{1}{2} - \overline{g}\right][\text{MAX}(g(r)) + \text{MIN}(g(r))]^{-1} \geq \overline{b} \\ \frac{1}{2}\left[1 + [\text{MAX}(g(r)) - \text{MIN}(g(r))]\left[\overline{g} - \frac{1}{2}\right]^{-1} \overline{b}\right] \geq |b| > 0 \end{cases} \quad (A18)$$

and finally the explicit bounds on $|b|$ and $\overline{b}$ are found for successful generation of a binary $0/\pi$ phase modulation with approximately uniform amplitude:

$$\begin{cases} \frac{1}{2}[1 + [\text{MIN}(g(r)) - \text{MAX}(g(r))][\text{MAX}(g(r)) + \text{MIN}(g(r))]^{-1}] \geq |b| > 0 \\ \left[\frac{1}{2} - \overline{g}\right][\text{MAX}(g(r)) + \text{MIN}(g(r))]^{-1} \geq \overline{b} \end{cases} \quad (A19)$$

Depending on the accuracy needed for the description of the interferograms one can choose to include a number of spatial higher order terms from the expansion of the SRW in Equation (A7). The influence of the higher order terms has the largest impact along the boundaries of the imaged aperture. For η-values smaller than 0.627 and when operating within the central region of the image plane, spatial higher order terms are insignificant and we can approximate the synthetic reference wave with the first and space invariant term:

$$g(r' \in \text{central region}) \approx 1 - J_0(1.22\pi\eta) \quad (A20)$$

so that we can simplify Equation (A3) to give:

$$o(x',y') = A[\alpha(x',y') \text{ circ } (r'/\Delta r) + K\overline{\alpha}(BA^{-1}\exp(i\theta) - 1)] \quad (A21)$$

where $K = 1 - J_0(1.22\pi\eta)$. The influence of the finite on-axis filtering radius on the focused light is thus effectively included as an extra "filtering parameter" so that the four-parameter filter set (A, B, θ, K(η)) together with the input amplitude dependent term, $\overline{\alpha}$, effectively defines the type of filtering scheme we are applying.

From Equation (A21) we see that the filter parameters (A, B, θ) can be combined to form a single complex valued term, C, the combined filter term, such that:

$$C = |C| \exp(i\psi_C) = BA^{-1} \exp(i\theta)^{-1} \quad (A22)$$

therefore, Equation (A21) can be further simplified to give:

$$\begin{cases} o(x', y') = [\alpha(x', y')\text{circ}(r'/\Delta r) + K\overline{\alpha}|C|\exp(i\psi_C)] \text{ for } BA^{-1} \leq 1 \\ o(x', y') = |C+1|^{-1}[\alpha(x', y')\text{circ}(r'/\Delta r) + K\overline{\alpha}|C|\exp(i\psi_C)] \text{ for } 1 < BA^{-1} \end{cases} \quad (A23)$$

where it has been implicitly assumed that unnecessary absorption of light in the Fourier filter is minimized and where:

$$\begin{cases} BA^{-1} = \sqrt{1 + 2|C|\cos(\psi_C) + |C|^2} \\ \theta = \sin^{-1}((BA^{-1})^{-1}|C|\sin(\psi_C)) \end{cases} \quad (A24)$$

Within the framework of the combined filter term and flat SRW profile region it is now a relatively straightforward task to analytically derive the governing equations for obtaining pure phase read-out:

$$K\overline{\alpha}|C||\cos(\psi_C)| = \frac{1}{2}(\text{Max}(\alpha(x, y)) + \text{Min}(\alpha(x, y))) \quad (A25)$$

which is further simplified for loss less filters—with $|C| = 2|\cos(\psi_C)|$, from Equation (A22)—to give:

$$K\overline{\alpha}|C|^2 = \text{Max }(\alpha(x,y)) + \text{Min }(\alpha(x,y)) \quad (A26)$$

Procedure for realizing phase-only read-out according to the present invention, utilizing a phase modulating system with a circularly truncated input aperture and a zero-order filter:

First calculate $\eta = (0.61)^{-1}\Delta r \Delta f_r$ for the optics in use where filter size in spatial frequency space is given by: $\Delta f_r = (\lambda f)^{-1}\Delta r_f$. Here f is the focal length of the first Fourier transforming lens, λ is the wavelength of electromagnetic radiation and $\Delta r$ and $\Delta r_f$ is the physical input aperture radius and filter dot radius, respectively.

Calculate $K = 1 - J_0(1.22\pi\eta)$ for the optics in use inserting η from above in the argument for the zero'th order Bessel function.

These initial calculations are specific to the utilized system, the freedom of design of the phase modulation pattern $\arg[o(x',y')]$ lies in the adjustment of $\alpha(x,y)$ in relation to $H(f_x, f_y)$. The following steps describes the constrains in the design of the phase modulation pattern $\arg[o(x',y')]$, and can be carried out in any order:

Choose operating values for input amplitude pattern Max ($\alpha(x,y)$) and Min($\alpha(x,y)$).

Calculate the average of the input amplitude pattern, $\overline{\alpha}$, from the spatial distribution of the desired pattern.

Realize the combined filter parameter that fulfils Equation (A25) or in case of loss less filters Equation (A26).

Experimental Results

Figure 12:
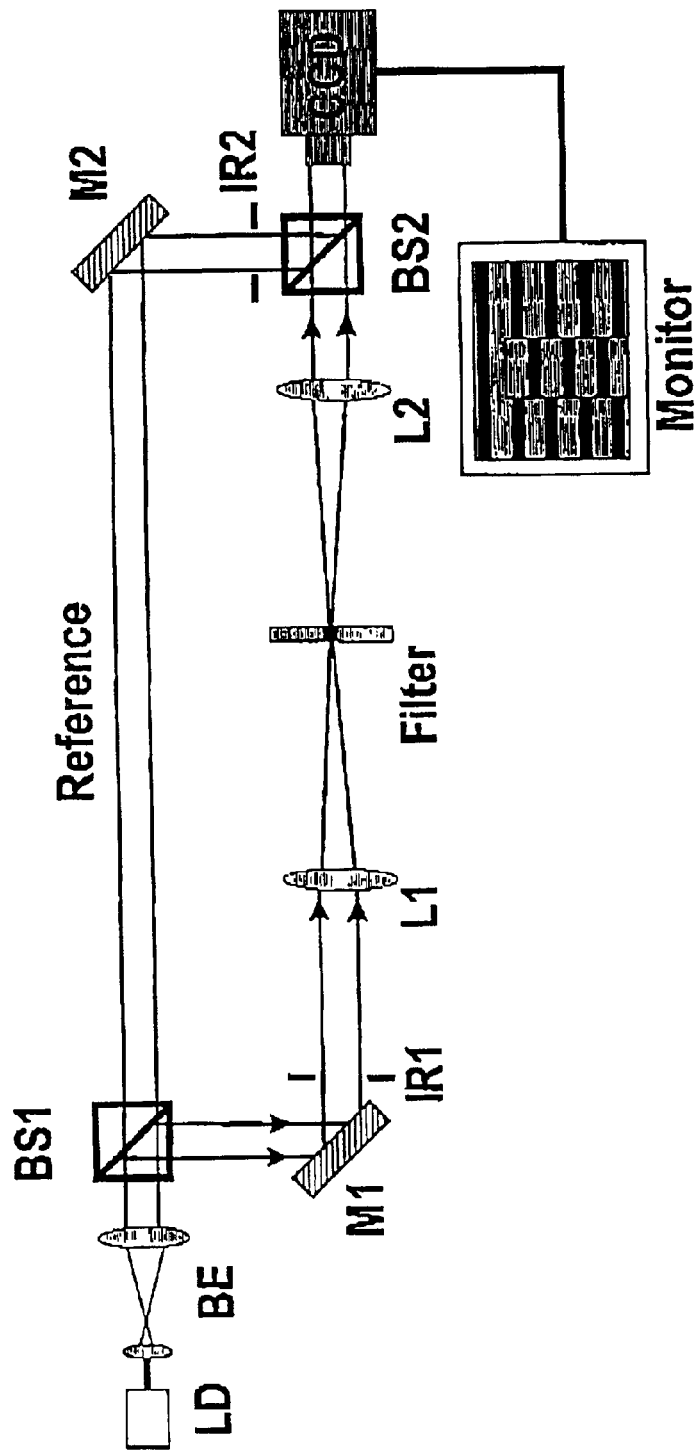
FIG. 12 shows an experimental system for verification of the present invention.

An experimental system for verification of a method and a system according to the present invention is shown in FIG. 12. The light source of the experimental system is a 635 nm laser diode LD. The light beam emitted by the laser diode LD is spatially filtered, expanded and collimated with a beam expander BE whereby a substantially plane wave front is generated. A wave front of an electromagnetic field or wave is a surface in space along which the phase of the field does not change. Lenses L1 and L2 (f=200 mm) form a 4-f system with a Fourier filter positioned between L1 and L2, and the amplitude modulation AM is performed in the plane of the iris (IR1) constituting an input aperture for the phase modulating system. The experimental system also comprises an interferometer for determination of the phase at the output of the phase modulating system. The beam splitters BS1 and BS2 and mirrors M1 and M2 form a reference arm for a Mach-Zender interferometer producing output fringes that are recorded on a CCD camera. The second iris IR2 is used to control the size of the reference beam. The Fourier filter is a phase-only filter with no amplitude damping. The central region of the filter is circular symmetric and has a 60 mm diameter phase shifting region with a thickness providing a phase shift of π at 635 nm.

A Hamamatsu parallel aligned liquid crystal modulator together with a polarizer generates binary on/off modulation of the amplitude of the input wave front with a 25% fill factor. In general, such a spatial light modulator (SLM) will have a lower contrast than a fixed mask and the resolution of the resulting phase distribution will be limited to that of the modulator.

Figure 13:
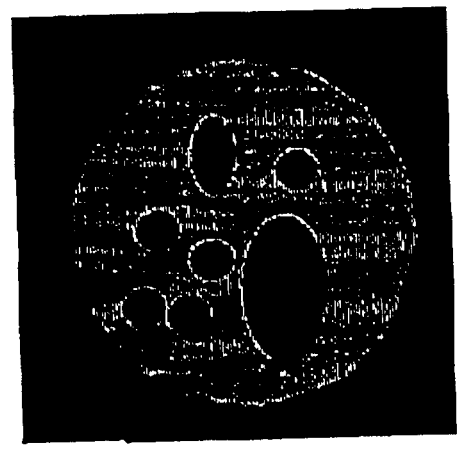
FIG. 13 shows an input amplitude modulated wave front.

FIG. 13 illustrates the amplitude modulation of the wave front entering the phase modulating system. The image of FIG. 13 is recorded with the system without the Fourier plane filter in place. The image consists of a number of circular and ellipsoidal dark regions on a light background. The 4 mm iris is slightly out of focus due to an axial displacement between the SLM and iris and some slight interference fringes are visible due to stray light scattered off the beam-splitter in front of the SLM.

Figure 14:
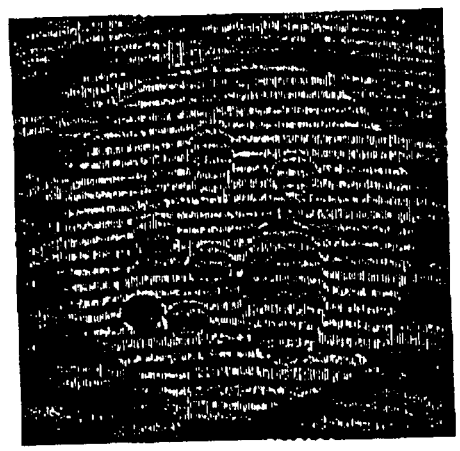
FIG. 14 shows an interference fringe pattern of a phase modulated wave front.

The interferometer phase measurements are shown in FIG. 14. It is seen that the binary phase modulation is imposed on a uniform amplitude wave front. The fringe spacing indicates a phase shift of approximately π in the output modulation and thus the input amplitude modulation has been converted into a corresponding desired spatially phase modulation. The fringes occurring in the region outside the aperture are caused by light scattered by the filtering operation.

Thus, with the experimental system, phase-only spatial light modulation is provided using an amplitude spatial light modulator and a phase-only spatial filter.

What is claimed is:

1. A method for generating a phase-modulated wave front of electromagnetic radiation comprising the steps of:

provviding an input wave front of electromagnetic radiation, $E(x,y)$, performing a spatial amplitude modulation $\alpha(x,y)$ on the input wave front to generate a spatial amplitude distribution $a(x,y)$ in the electromagnetic radiation in a plane transverse to a direction of propagation of the electromagnetic radiation, Fourier or Fresnel transforming the amplitude-modulated wave front $a(x,y)$ to form a Fourier or Fresnel distribution of the amplitude-modulated wave front $\tilde{a}(f_x,f_y)$, said Fourier or Fresnel distribution comprising Fourier or Fresnel components, filtering the Fourier or Fresnel distribution by phase shifting one or more first components in relation to one or more second components of the Fourier or Fresnel distribution $\tilde{a}(f_x,f_y)$ and/or damping one or more third components in relation to one or more fourth components of the Fourier or Fresnel distribution $\tilde{a}(f_x,f_y)$ by a spatial filter having a filter function $H(f_x,f_y)$ giving the phase shift and/or damping for each component of the Fourier or Fresnel distribution $\tilde{a}(f_x,f_y)$, and inverse Fourier or inverse Fresnel transforming the filtered electromagnetic radiation whereby a phase-modulated wave front $o(x',y')$ is formed, said phase-modulated wave front being a function of at least the input wave front $E(x,y)$, the amplitude modulation $\alpha(x,y)$, and the filter function $H(f_x,f_y)$.

2. A method according to claim 1, further comprising the step of adjusting the spatial amplitude modulation $\alpha(x,y)$ in relation to the filter function $H(f_x,f_y)$, or vice versa, in order to generate a predetermined phase-modulation.

3. A method according to claim 2, further comprising the step of providing means for performing the spatial amplitude modulation $\alpha(x,y)$ and/or the spatial filter which are addressable and adapted to receive one or more control signals controlling the spatial amplitude modulation $\alpha(x,y)$ and/or the filter function $H(f_x,f_y)$, the method further comprising the step of addressing the means for performing the spatial amplitude modulation and/or the spatial filter, and transmitting said one or more control signals.

4. A method according to claim 1, the method being characterized in that the generated phase-modulated wave front $o(x',y')$ has an at least substantially constant amplitude in a plane transverse to a direction of propagation of the phase-modulated wave front.

5. A method according to claim 1, wherein a spatial phase distribution of the input wave front $E(x,y)$ is at least substantially constant over the input wave front.

6. A method according to claim 1, wherein the input electromagnetic radiation is at least substantially spatially and temporally coherent.

7. A method according to claim 1, wherein the step of performing the spatial amplitude modulation further comprises the step of defining a transverse spatial profile of the amplitude modulated wave front $a(x,y)$.

8. A method according to claim 1, wherein the spatial amplitude modulation is performed by an optical element providing a substantially continuous variation of absorption and/or reflection in a plane transverse to a direction of propagation of the electromagnetic radiation.

9. A method according to claim 1, wherein the spatial amplitude modulation is performed by an optical element comprising a matrix of absorbing and/or reflecting elements.

10. A method according to claim 9, wherein the absorbing and/or reflecting elements are individually addressable so as to individually control the absorption and/or reflection of each element.

11. A method according to claim 1, wherein the Fourier or Fresnel transformation and/or the inverse Fourier or inverse Fresnel transformation is performed by a lens or a diffracting pattern.

12. A method according to claim 1, wherein the spatial filter comprises one or more individually addressable and controllable phase shifting and/or damping elements.

13. A method according to claim 12, further comprising the step of individually controlling one or more phase shifting and/or damping elements in order to individually control the phase shift and/or damping of one or more components of the Fourier or Fresnel distribution.

14. A method according to claim 1, wherein the spatial amplitude modulation $\alpha(x,y)$ has three or more different values, the method further comprising the step of, after the inverse Fourier transformation or the inverse Fresnel transformation, performing a spatial amplitude modulation $\alpha_2(x',y')$ on the phase modulated wave front $o(x',y')$ to generate an at least substantially constant amplitude distribution.

15. A method for generating a phase-modulated wave front of electromagnetic radiation comprising the steps of:

providing an input wave front of electromagnetic radiation, $E(x,y)$, performing a spatial amplitude modulation $\alpha(x,y)$ on the input wave front to generate a spatial amplitude distribution $a(x,y)$ in the electromagnetic radiation in a plane transverse to a direction of propagation of the electromagnetic radiation, Fourier or Fresnel transforming the amplitude-modulated wave front $a(x,y)$ to form a Fourier or Fresnel distribution of the amplitude-modulated wave front $\tilde{a}(f_x,f_y)$ said Fourier or Fresnel distribution comprising Fourier or Fresnel components, filtering the Fourier or Fresnel distribution by phase shifting at least part of a zero-order component of the Fourier or Fresnel distribution $\tilde{a}(f_x,f_y)$ in relation to other components of the Fourier or Fresnel distribution and/or damping a zero-order component of the Fourier or Fresnel distribution $\tilde{a}(f_x,f_y)$ in relation to other components of the Fourier or Fresnel distribution by a spatial filter having a filter function $H(f_x,f_y)$ giving the phase shift and/or damping of the zero-order component in relation to higher-order components of the Fourier or Fresnel distribution $\tilde{a}(f_x,f_y)$, and inverse Fourier or inverse Fresnel transforming the filtered electromagnetic radiation whereby a phase-modulated wave front o(x',y') is formed, said phase-modulated wave front being a function of at least the input wave front E(x,y), the amplitude modulation α(x,y), and the filter function H($f_x$,$f_y$).

16. A method according to claim 15, further comprising the step of adjusting the spatial amplitude modulation α(x,y) in relation to the filter function H($f_x$,$f_y$), or vice versa, in order to generate a predetermined phase-modulation.

17. A method according to claim 16, further comprising the step of providing means for performing the spatial amplitude modulation α(x,y) and/or the spatial filter which are addressable and adapted to receive one or more control signals controlling the spatial amplitude modulation α(x,y) and/or the filter function H($f_x$,$f_y$), the method further comprising the step of addressing the means for performing the spatial amplitude modulation and/or the spatial filter, and transmitting said one or more control signals.

18. A method according to claim 15, the method being characterized in that the generated phase-modulated wave front o(x',y') has an at least substantially constant amplitude in a plane transverse to a direction of propagation of the phase-modulated wave front.

19. A method according to claim 15, wherein a spatial phase distribution of the input wave front E(x,y) is at least substantially constant over the input wave front.

20. A method according to claim 15, wherein the input electromagnetic radiation is at least substantially spatially and temporally coherent.

21. A method according to claim 15, wherein the step of performing the spatial amplitude modulation further comprises the step of defining a transverse spatial profile of the amplitude modulated wave front a(x,y).

22. A method according to claim 15, wherein the spatial amplitude modulation α(x,y) is performed by an optical element providing a substantially continuous variation of absorption and/or reflection in a plane transverse to a direction of propagation of the electromagnetic radiation.

23. A method according to claim 15, wherein the spatial amplitude modulation α(x,y) is performed by an optical element comprising a matrix of absorbing and/or reflecting elements.

24. A method according to claim 23, wherein the absorbing and/or reflecting elements are individually addressable so as to individually control the absorption and/or reflection of each element.

25. A method according to claim 15, wherein the Fourier or Fresnel transformation and/or the inverse Fourier or inverse Fresnel transformation is performed by a lens or a diffracting pattern.

26. A method according to claim 15, wherein the spatial filter is a phase contrast filter.

27. A method according to claim 15, wherein the spatial filter comprises one or more individually addressable and controllable phase shifting and/or damping elements.

28. A method according to claim 27, further comprising the step of individually controlling one or more phase shifting and/or damping elements in order to individually control the phase shift and/or damping of the zero-order component of the Fourier or Fresnel distribution in relation to higher-order components of the Fourier or Fresnel distribution.

29. A method according to claim 15, wherein the spatial amplitude modulation α(x,y) has a minimum value Min(α(x,y)), a maximum value Max(α(x,y)) and an average value ā, and wherein the spatial filter has a central part for performing the filtering of the zero order component of the Fourier or Fresnel distribution $\bar{a}(f_x,f_y)$ and a surrounding part for performing the filtering of the higher order components, the surrounding part having a transmittivity or reflectivity A in the range 0<A≦1 and the central part having a transmittivity or reflectivity B in the range 0≦B≦1, and the relative phase shift of radiation filtered by the central part and the surrounding part being θ, where A, B, and θ are variables of the filter function H($f_x$,$f_y$) and forms a combined filter term C expressed as $$C = \frac{B}{A}e^{i\theta} - 1 = |C|e^{i\psi_c}.$$

30. A method according to claim 29, wherein H($f_x$,$f_y$) is adjusted to have A=B=1 and θ=π, and wherein the spatial amplitude modulation α(x,y) is performed according to $$\alpha(x,y) = b(x,y) + \bar{b}\left[\frac{1}{2} - \bar{g}\right]^{-1} g(r),$$

where b(x,y) is a binary function with an average value $\bar{b}$, g(r) is a function which counterbalances effects represented by a synthetic reference wave g(r'), and $\bar{g}$ is the average value of g(r).

31. A method according to claim 29, wherein the spatial amplitude modulation a(x,y) is an at least substantially binary function whereby the phase-modulated wave front is generated with a binary phase-modulation.

32. A method according to claim 31, further comprising the step of adjusting the spatial amplitude modulation α(x,y) in relation to the filter function H($f_x$,$f_y$), or vice versa, according to the following steps
 determining a spatial relation η being a ratio between a size of the central part of the spatial filter and a size of the zero order component of the Fourier or Fresnel transformed amplitude-modulated wave front $\bar{a}(f_x,f_y)$ at the position of the spatial filter,
 determining a parameter K(η) expressing a relative amplitude of radiation within the central part of the spatial filter,
 where expressions for η and K(η) are specific for a specific spatial profile of the amplitude modulated wave front a(x,y), and
 adjusting the parameters η, C, Min(α(x,y)), Max(α(x,y)) and a to at least substantially fulfill $$K\bar{\alpha}|C|\cos(\psi_c)| = \frac{1}{2}(\text{Max}(\alpha(x,y)) + \text{Min}(\alpha(x,y))),$$

in order to generate a predetermined phase-modulation.

33. A method according to claim 32, wherein η is determined according to $$\eta = \gamma \frac{\Delta s \cdot \Delta s_f}{\lambda \cdot F},$$

where Δs is a size of the amplitude-modulated wave front a(x,y), $\Delta s_f$ is a size of the central part of the spatial filter, γ is a geometrical parameter specific to a spatial profile of the amplitude modulated wave front a(x,y), λ is wavelength of the electromagnetic radiation, and F is focal length of the Fourier or Fresnel transformation.

34. A method according to claim 32, wherein the amplitude modulated wave front a(x,y) and the central part of the spatial filter have an at least substantially circular spatial profile, the steps of determining the parameters η and K(η) comprising determining η and K(η) according to $$\eta = \frac{1}{0.61} \frac{\Delta r \cdot \Delta r_f}{\lambda \cdot F},$$

where Δr is a radius of the amplitude-modulated wave front a(x,y) and Δr$_f$ is a radius of the central part of the spatial filter, and $$K=1-J_0(1.22\pi\eta),$$

where J$_0$ is a zero'th order Bessel function.

35. A method according to claim 29, wherein the amplitude modulated wave front a(x,y) and the central part of the spatial filter at least substantially have a spatial profile selected from the group consisting of triangular, rectangular, quadratic, rhombic, pentagonal, hexagonal, and ellipsoidal.

36. A method according to claim 15, wherein the spatial amplitude modulation α(x,y) has three or more different values, the method further comprising the step of, after the inverse Fourier transformation or the inverse Fresnel transformation, performing a spatial amplitude modulation α$_2$(x',y') on the phase modulated wave front o(x',y') to generate an at least substantially constant amplitude distribution.

37. A system for generating a phase-modulated wave front of electromagnetic radiation, said system comprising
  a first deflecting and/or absorbing device for receiving an input wave front E(x,y) of electromagnetic radiation, performing a spatial amplitude modulation α(x,y) on the input wave front by deflecting and/or absorbing parts of the wave front to generate a spatial amplitude distribution a(x,y) in a plane transverse to a direction of propagation of the wave front, and emitting the amplitude modulated wave front a(x,y),
  means for Fourier or Fresnel transforming the amplitude-modulated wave front a(x,y) to form a Fourier or Fresnel distribution ā(f$_x$,f$_y$), said Fourier or Fresnel distribution comprising Fourier or Fresnel components,
  a spatial filter for receiving the Fourier or Fresnel distribution ã(f$_x$,f$_y$), phase shifting one or more first components in relation to one or more second components of the Fourier or Fresnel distribution and/or damping one or more third components in relation to one or more fourth components of the Fourier or Fresnel distribution, and emitting a filtered distribution ā'(f$_x$,f$_y$), said spatial filter being characterized by a filter function H(f$_x$,f$_y$) which gives the damping and/or phase shift for each component of the Fourier or Fresnel distribution ā(f$_x$,f$_y$),
  means for inverse Fourier or inverse Fresnel transforming the filtered electromagnetic radiation to form a phase-modulated wave front o(x',y'), said phase-modulated wave front being a function of at least the input wave front E(x,y), the amplitude modulation α(x,y), and the filter function H(f$_x$,f$_y$).

38. A system according to claim 37, further comprising a controller for controlling the spatial amplitude modulation α(x,y) in relation to the filter function H(f$_x$,f$_y$), or vice versa, so as to generate a predetermined phase-modulated wave front o(x',y').

39. A system according to claim 38, wherein the controller comprises interface means for addressing the first deflecting and/or absorbing device and/or the spatial filter and for transmitting control signals controlling the amplitude modulation α(x,y) and/or the filter function H(f$_x$,f$_y$).

40. A system according to claim 39, wherein the controller further comprises holding means for holding information related to the amplitude modulation α(x,y) and/or the filter function H(f$_x$,f$_y$), the controller being adapted to generate the control signals transmitted by the interface means on the basis of the information held in the holding means.

41. A system according to claim 39, wherein the first deflecting and/or absorbing device comprises a matrix of deflecting and/or absorbing elements, and wherein said elements can be individually addressed by the interface means in order to control the deflection and/or absorption of each element individually.

42. A system according to claim 38, wherein the controller comprises electronic processing means for calculating the amplitude modulation α(x,y) and/or the filter function H(f$_x$,f$_y$), or parameters thereof.

43. A system according to claim 38, wherein the controller is adapted to control the spatial amplitude modulation α(x,y) to define a transverse spatial profile for the amplitude modulated wave front a(x,y).

44. A system according to claims 38, wherein the controller is adapted to individually control one or more phase shifting and/or damping elements for individually controlling the phase shift and/or damping of one or more components of the Fourier or Fresnel distribution.

45. A system according to claim 37, wherein the first deflecting and/or absorbing device provides a substantially continuous variation of absorption and/or deflection in a plane transverse to a direction of propagation of the electromagnetic radiation.

46. A system according to claim 37, wherein the first deflecting and/or absorbing device further comprises an aperture for defining a transverse spatial profile for the amplitude modulated wave front a(x,y).

47. A system according to claim 37, wherein the means for Fourier or Fresnel transforming and/or the means for inverse Fourier or inverse Fresnel transforming is selected from the group consisting of achromatic lenses, Fourier lenses, doublets planar lenses, diffracting patterns, and free space propagation.

48. A system according to claim 37, wherein the spatial filter comprises one or more individually addressable and controllable phase shifting and/or damping elements.

49. A system according to claim 37, further comprising a second deflecting and/or absorbing device for receiving the phase modulated wave front o(x',y') and performing a spatial amplitude modulation α$_2$(x',y') on the phase modulated wave front o(x',y') by deflecting and/or absorbing parts of the phase modulated wave front in order to generate a wave front having an at least substantially constant amplitude distribution.

50. A system for generating a phase-modulated wave front of electromagnetic radiation, said system comprising
  a first deflecting and/or absorbing device for receiving an input wave front E(x,y) of electromagnetic radiation, performing a spatial amplitude modulation α(x,y) on the input wave front by deflecting and/or absorbing parts of the wave front to generate a spatial amplitude distribution a(x,y) in a plane transverse to a direction of propagation of the wave front, and emitting the amplitude modulated wave front a(x,y),
  means for Fourier or Fresnel transforming the amplitude-modulated wave front a(x,y) to form a Fourier or Fresnel distribution ā(f$_x$,f$_y$) said Fourier or Fresnel distribution comprising Fourier or Fresnel components, a spatial filter for receiving the Fourier or Fresnel distribution $\tilde{a}(f_x,f_y)$, phase shifting a zero-order component of the Fourier or Fresnel distribution in relation to other components of the Fourier or Fresnel distribution and/or damping a zero-order component of the Fourier or Fresnel distribution in relation to other components of the Fourier or Fresnel distribution, and emitting a filtered distribution $\tilde{a}'(f_x,f_y)$, said spatial filter being characterized by a filter function $H(f_x,f_y)$ which gives the damping and/or phase shift of the zero-order component in relation to other components of the Fourier or Fresnel distribution $\tilde{a}(f_x,f_y)$, and means for inverse Fourier or inverse Fresnel transforming the filtered electromagnetic radiation to form a phase-modulated wave front $o(x',y')$, said phase-modulated wave front being a function of at least the input wave front $E(x,y)$, the amplitude modulation $\alpha(x,y)$, and the filter function $H(f_x,f_y)$.

51. A system according to claim 50, further comprising a controller for controlling the spatial amplitude modulation $\alpha(x,y)$ in relation to the filter function $H(f_x,f_y)$, or vice versa, so as to generate a predetermined phase-modulated wave front $o(x',y')$.

52. A system according to claim 51, wherein the controller comprises interface means for addressing the first deflecting and/or absorbing device and/or the spatial filter and for transmitting control signals controlling the amplitude modulation $\alpha(x,y)$ and/or the filter function $H(f_x,f_y)$.

53. A system according to claim 52, wherein the controller further comprises holding means for holding information related to the amplitude modulation $\alpha(x,y)$ and/or the filter function $H(f_x,f_y)$, the controller being adapted to generate the control signals transmitted by the interface means on the basis of the information held in the holding means.

54. A system according to claim 52, wherein the first deflecting and/or absorbing device comprises a matrix of deflecting and/or absorbing elements, and wherein said elements can be individually addressed by the interface means in order to control the deflection and/or absorption of each element individually.

55. A system according to claim 54, wherein the first deflecting and/or absorbing device has a resolution equal to or higher than 100 elements/cm$^2$.

56. A system according to claim 54, wherein the first deflecting and/or absorbing device comprises at least 100 deflecting and/or absorbing elements.

57. A system according to claim 51, wherein the controller comprises electronic processing means for calculating the amplitude modulation $\alpha(x,y)$ and/or the filter function $H(f_x,f_y)$, or parameters thereof.

58. A system according to claim 51, wherein the controller is adapted to control the spatial amplitude modulation $\alpha(x,y)$ to define a transverse spatial profile for the amplitude modulated wave front $a(x,y)$.

59. A system according to claim 58, wherein the controller is adapted to control the spatial amplitude modulation $\alpha(x,y)$ to define a spatial profile selected from the group consisting of triangular, rectangular, quadratic, rhombic, pentagonal, hexagonal, circular, and ellipsoidal for the amplitude modulated wave front $a(x,y)$.

60. A system according to claims 51, wherein the controller is adapted to individually control one or more phase shifting and/or damping elements for individually controlling the phase shift and/or damping of the zero-order component of the Fourier or Fresnel distribution $\tilde{a}(f_x,f_y)$ in relation to other components of the Fourier or Fresnel distribution.

61. A system according to claim 50, wherein the first deflecting and/or absorbing device provides a substantially continuous variation of absorption and/or deflection in a plane transverse to a direction of propagation of the electromagnetic radiation.

62. A system according to claim 61, wherein the first deflecting and/or absorbing device is a silver halide film.

63. A system according to claim 50, wherein the first deflecting and/or absorbing device further comprises an aperture for defining a transverse spatial profile for the amplitude modulated wave front $a(x,y)$.

64. A system according to claim 63, wherein the aperture defines a spatial profile selected from the group consisting of triangular, rectangular, quadratic, rhombic, pentagonal, hexagonal, circular, and ellipsoidal for the amplitude modulated wave front $a(x,y)$.

65. A system according to claim 63, wherein the spatial profile of the amplitude modulated wave front $a(x,y)$ and the central part of the spatial filter is defined to have a spatial profile selected from the group consisting of triangular, rectangular, quadratic, rhombic, pentagonal, hexagonal, and ellipsoidal.

66. A system according to claim 63, wherein the spatial profile of the amplitude modulated wave front $a(x,y)$ and the central part of the spatial filter is defined to be at least substantially circular, and wherein the parameters $\eta$ and $K(\eta)$ are determined according to $$\eta = \frac{1}{0.61}\frac{\Delta r - \Delta r_f}{\lambda \cdot F},$$

where $\Delta r$ is a radius of the amplitude-modulated wave front $a(x,y)$ and $\Delta r_f$ is a radius of the central part of the spatial filter, and $$K=1-J_0(1.22\pi\eta)$$

where $J_0$ is a zero'th order Bessel function.

67. A system according to claim 50, wherein the means for Fourier or Fresnel transforming and/or the means for inverse Fourier or inverse Fresnel transforming is selected from the group consisting of achromatic lenses, Fourier lenses, doublets planar lenses, diffracting patterns, and free space propagation.

68. A system according to claim 50, wherein the spatial filter is a phase contrast filter.

69. A system according to claim 50, wherein the spatial filter comprises one or more individually addressable and controllable phase shifting and/or damping elements.

70. A system according to claim 50, further comprising a second deflecting and/or absorbing device for receiving the phase modulated wave front $o(x',y')$ and performing a spatial amplitude modulation $\alpha_2(x',y')$ on the phase modulated wave front $o(x',y')$ by deflecting and/or absorbing parts of the phase modulated wave front in order to generate a wave front having an at least substantially constant amplitude distribution.

71. A system according to claim 50, wherein the first deflecting and/or absorbing device is a reflective device comprising one or more reflecting surfaces adapted to receive the input wave front $E(x,y)$ of electromagnetic radiation, reflect at least part of the received electromagnetic radiation and emit the reflected radiation as the amplitude modulated wave front $\alpha(x,y)$.

72. A system according to claim 50, wherein the first deflecting and/or absorbing device is a transmitting device being adapted to receive the input wave front of electromagnetic radiation, transmit at least part of the received electromagnetic radiation and emit the transmitted radiation as the amplitude modulated wave front.

73. A system according to claim 50, wherein the spatial filter is a transmitting device being adapted to receive the Fourier or Fresnel distribution, transmit at least part of one or more Fourier or Fresnel components or transmit at least part of one or more Fourier or Fresnel components and phase shift one or more first components in relation to one or more second components of the Fourier or Fresnel distribution, and emit the transmitted radiation as the filtered distribution.

74. A system according to claim 50, wherein the spatial filter is a reflective device comprising one or more reflecting surfaces adapted to receive the Fourier or Fresnel distribution, reflect at least part of one or more Fourier or Fresnel components or reflect at least part of one or more Fourier or Fresnel components and phase shift one or more first components in relation to one or more second components of the Fourier or Fresnel distribution, and emit the reflected radiation as the filtered distribution.

75. A system according to claim 50, wherein the spatial filter has a central part for performing the filtering of the zero order component of the Fourier or Fresnel distribution $\tilde{a}(f_x,f_y)$ and a surrounding part for performing the filtering of the higher order components, the surrounding part having a transmittivity or reflectivity $A \in \{0;1\}$ and the central part having a transmittivity or reflectivity $B \in \{0;1\}$, and the relative phase shift of radiation filtered by the central part and the surrounding part being $\theta$, where A, B, and $\theta$ are variables of the filter function $H(f_x,f_y)$ and forms a combined filter term C expressed as $$C = \frac{B}{A}e^{i\theta} - 1 = |C|e^{i\Psi_c}, \text{ and}$$

wherein a minimum value $\text{Min}(\alpha(x,y))$, a maximum value $\text{Max}(\alpha(x,y))$, and an average value $\overline{\alpha}$ can be assigned to the amplitude modulation $\alpha(x,y)$ performed by the first deflecting and/or absorbing device.

76. A system according to claim 75, wherein $H(f_x,f_y)$ is adjusted to have $A=B=1$ and $\theta=\pi$, and wherein the first deflecting and/or absorbing device is adapted to perform the spatial amplitude modulation $\alpha(x,y)$ according to $$\alpha(x, y) = b(x, y) + \overline{b}\left[\frac{1}{2} - \overline{g}\right]^{-1} g(r),$$

where b(x,y) is a binary function with an average value $\overline{b}$, g(r) is a function which counterbalances effects represented by a synthetic reference wave g(r') of the system, and $\overline{g}$ is the average value of g(r).

77. A system according to claim 75, wherein the first deflecting and/or absorbing device is adapted to perform the spatial amplitude modulation $\alpha(x,y)$ according to an at least substantially binary function whereby the phase-modulated wave front is generated with a binary phase-modulation.

78. A system according to claim 77, wherein the first deflecting and/or absorbing device and the spatial filter are adapted to perform the spatial amplitude modulation $\alpha(x,y)$ and the filtering $H(f_x,f_y)$ according to $$K\overline{\alpha}|C|\cos(\psi_c)| = \frac{1}{2}(\text{Max}(\alpha(x, y)) + \text{Min}(\alpha(x, y))),$$

wherein η is a spatial relation being a ratio between a size of the central part of the spatial filter and a size of the zero order component of the Fourier or Fresnel transformed amplitude-modulated wave front $\overline{a}(f_x,f_y)$ at the position of the spatial filter, K(η) is a parameter expressing a relative amplitude of radiation within the central part of the spatial filter, and where expressions for η and K(η) are specific for a specific spatial profile of the amplitude modulated wave front a(x,y).

79. A system according to claim 78, wherein η is determined according to $$\eta = \gamma \frac{\Delta s \cdot \Delta s_f}{\lambda \cdot F},$$

where $\Delta s$ is a size of the amplitude-modulated wave front a(x,y), $\Delta s_f$ is a size of the central part of the spatial filter, γ is a geometrical parameter specific to a spatial profile of the amplitude modulated wave front a(x,y), λ is a wavelength of the electromagnetic radiation, and F is a focal length of the means for Fourier or Fresnel transforming.

80. A system according to claim 50, wherein the first deflecting and/or absorbing device is adapted to perform the spatial amplitude modulation ($\alpha$(x,y) according to a function having three or more different values, the system further comprising a second deflecting and/or absorbing device for receiving the phase modulated wave front o(x',y') and performing a spatial amplitude modulation $\alpha_2(x',y')$ to generate an at least substantially constant amplitude distribution.

* * * * *